US 012608005B2

(12) United States Patent
Chen et al.

(10) Patent No.: US 12,608,005 B2
(45) Date of Patent: Apr. 21, 2026

(54) SMART MOWER AND SMART MOWING SYSTEM

(71) Applicant: Nanjing Chervon Industry Co., Ltd., Nanjing (CN)

(72) Inventors: Weipeng Chen, Nanjing (CN); Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 293 days.

(21) Appl. No.: 18/301,774

(22) Filed: Apr. 17, 2023

(65) Prior Publication Data

US 2023/0259138 A1 Aug. 17, 2023

Related U.S. Application Data

(63) Continuation of application No. PCT/CN2020/135252, filed on Dec. 10, 2020.

(51) Int. Cl.
*G05D 1/00* (2024.01)
*A01D 34/00* (2006.01)
*G06V 10/80* (2022.01)

(52) U.S. Cl.
CPC ......... *G05D 1/0246* (2013.01); *A01D 34/008* (2013.01); *G05D 1/027* (2013.01); *G06V 10/80* (2022.01)

(58) Field of Classification Search
CPC .... A01D 34/008; A01D 34/006; G06V 10/80; G05D 1/0246; G05D 1/027;

(Continued)

(56) References Cited

U.S. PATENT DOCUMENTS

2011/0190931 A1* 8/2011 Anderson ............ A01D 34/008
427/136
2014/0032033 A1* 1/2014 Einecke ................ G06V 20/10
701/27

(Continued)

FOREIGN PATENT DOCUMENTS

CN 101359225 B 10/2010
CN 202958189 U 6/2013

(Continued)

OTHER PUBLICATIONS

Schepelmann, A. (2010). Identification & Segmentation of Lawn Grass Based on Color & Visual Texture Classifiers [Master's thesis, Case Western Reserve University]. OhioLink Electronic Theses and Dissertations Center. http://rave.ohiolink.edu/etdc/view?acc_num=case1274975598 (Year: 2010).*

(Continued)

*Primary Examiner* — Adam R Mott
*Assistant Examiner* — James Miller Watts, III
(74) *Attorney, Agent, or Firm* — Greenberg Traurig, LLP

(57) ABSTRACT

A smart mower includes a camera for collecting image data of the environment around the smart mower; an inertial measurement unit (IMU) for detecting pose data of the smart mower; a memory at least used for storing an application program for controlling the smart mower to work or travel; and a processor for calling the application program, fusing the image data collected by the camera and the pose data acquired by the IMU, performing simultaneous localization and mapping (SLAM) of the smart mower, and generating a navigation or mowing action instruction.

8 Claims, 27 Drawing Sheets

(58) Field of Classification Search

CPC .. G05D 1/0274; G05D 1/0214; G05D 1/0088; G05D 1/0212; G05D 1/0219; G01C 21/1656

See application file for complete search history.

(56) References Cited

U.S. PATENT DOCUMENTS

| | | | | | |
|---|---|---|---|---|---|
| 2015/0163993 | A1 | | 6/2015 | Pettersson | |
| 2017/0215371 | A1 | * | 8/2017 | Fransen | B30B 9/20 |
| 2018/0125003 | A1 | | 5/2018 | Wu | |
| 2020/0068799 | A1 | | 3/2020 | Slembrouck et al. | |
| 2021/0229289 | A1 | * | 7/2021 | Wyatt | A47L 9/30 |
| 2022/0024485 | A1 | * | 1/2022 | Theverapperuma ... | G06V 20/58 |
| 2022/0155791 | A1 | * | 5/2022 | Lee | G05D 1/661 |
| 2022/0187841 | A1 | * | 6/2022 | Ebrahimi Afrouzi | |
| | | | | | G05D 1/0242 |

FOREIGN PATENT DOCUMENTS

| | | | | | |
|---|---|---|---|---|---|
| CN | 104924312 | A | * | 9/2015 | |
| CN | 205196323 | U | | 5/2016 | |
| CN | 106647765 | A | * | 5/2017 | G05D 1/0246 |
| CN | 107463168 | A | | 12/2017 | |
| CN | 109049007 | A | | 12/2018 | |
| CN | 110612492 | A | | 12/2019 | |
| CN | 211132795 | U | | 7/2020 | |
| EP | 3118815 | B1 | | 1/2017 | |

OTHER PUBLICATIONS

C. Soto, B. Song and A. K. Roy-Chowdhury, "Distributed multi-target tracking in a self-configuring camera network," 2009 IEEE Conference on Computer Vision and Pattern Recognition, Miami, FL, USA, 2009, pp. 1486-1493, doi: 10.1109/CVPR.2009.5206773 (Year: 2009).*

X. Ma and S. Ning, "Real-Time Visual-Inertial SLAM with Point-Line Feature using Improved EDLines Algorithm," 2020 IEEE 5th Information Technology and Mechatronics Engineering Conference (ITOEC), Chongqing, China, 2020, pp. 1323-1327, doi: 10.1109/ITOEC49072.2020.9141875 (Year: 2020).*

Translation of CN106647765A (Year: 2017).*

Translation of CN-104924312-A (Year: 2015).*

ISA/CN, International Search Report issued on PCT application No. PCT/CN2020/135252, dated Sep. 8, 2021, 3 pages.

ISA/CN, English translation of International Search Report issued on PCT application No. PCT/CN2020/135252, dated Sep. 8, 2021, 2 pages.

ISA/CN, Written Opinion issued on PCT application No. PCT/CN2020/135252, dated Sep. 8, 2021, 4 pages.

ISA/CN, English translation of Written Opinion issued on PCT application No. PCT/CN2020/135252, dated Sep. 8, 2021, 3 pages.

Office Action from Canadian application No. 3,200,096, dated Jun. 26, 2025, 8 pp.

Extended Search Report from EP application No. 20964651.2, dated Dec. 11, 2025, 21 pp.

* cited by examiner

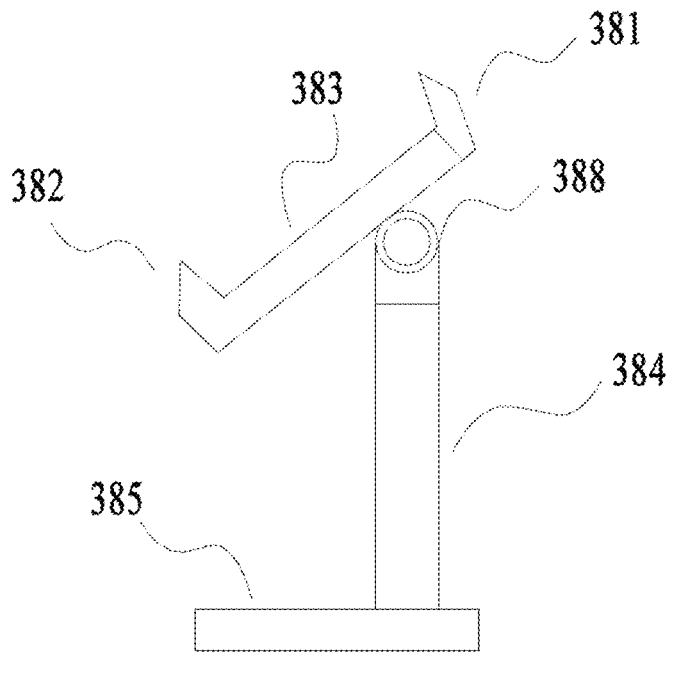
FIG. 19A
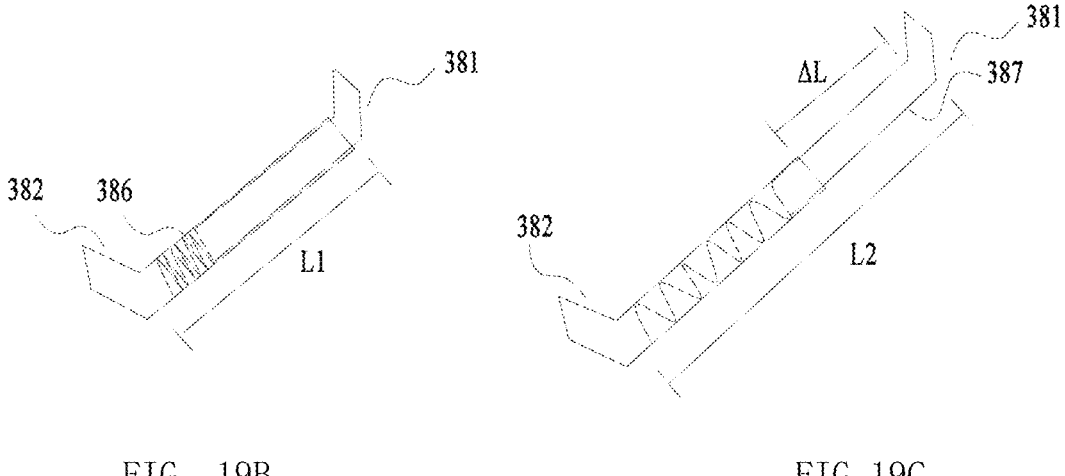
FIG. 19B
FIG. 19C

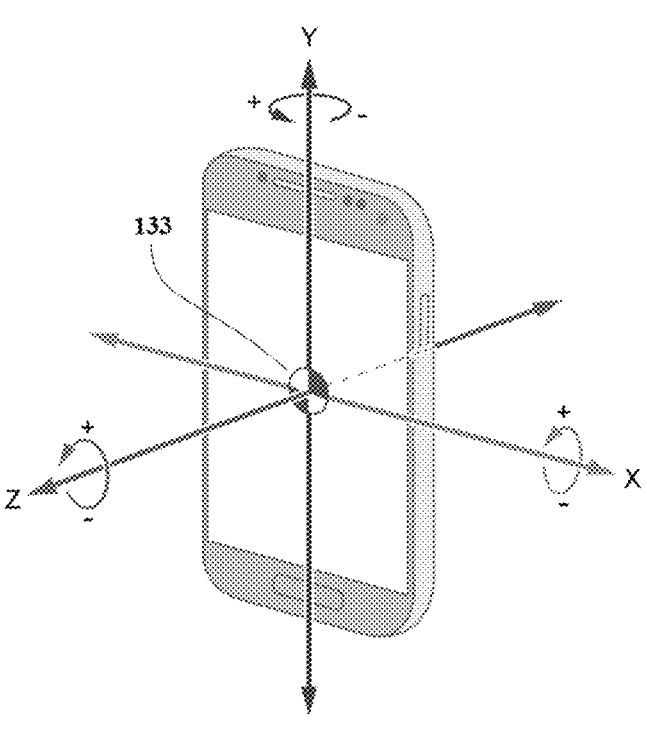
FIG. 21A
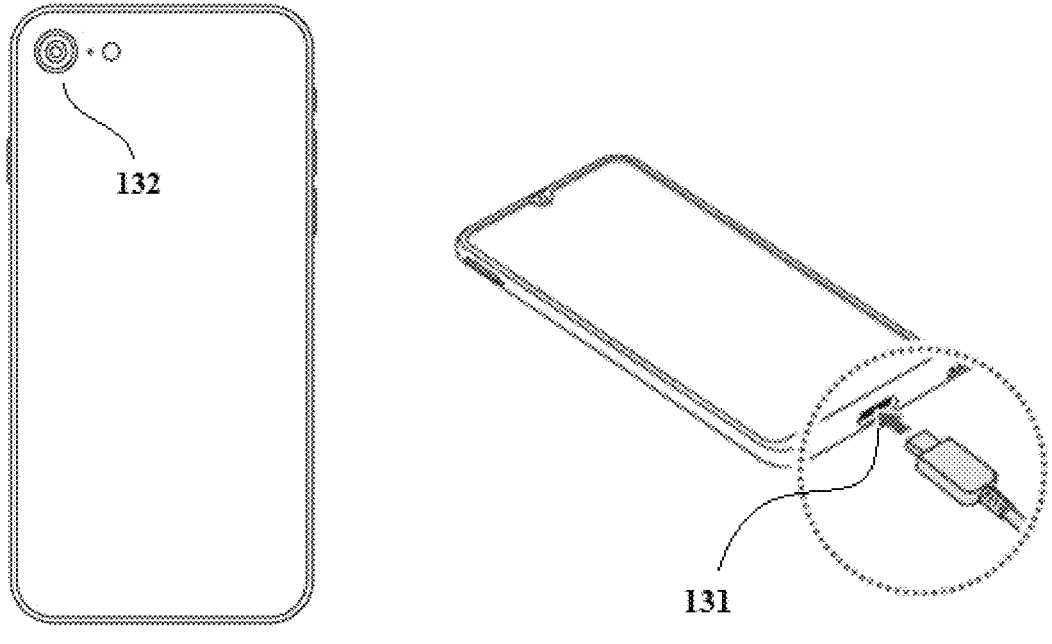
FIG. 21B                              FIG. 21C

130

131

310

313

SMART MOWER AND SMART MOWING SYSTEM

RELATED APPLICATION INFORMATION

This application is a continuation of International Application Number PCT/CN2020/135252, filed on Dec. 10, 2020, which application is incorporated herein by reference in its entirety.

TECHNICAL FIELD

The present application relates to a mower and a mowing system and, in particular, to a smart mower and a smart mowing system.

BACKGROUND

With the rise and popularity of smart homes, the technology of a smart mower develops, and the degree of acceptance by families increases gradually. No human effort is required to push and follow the smart mower, thereby greatly reducing the labor effort of a user and saving the user's time. Identification in regions is performed using the global positioning system (GPS) with common positioning accuracy and an accurate position is calculated using a boundary line signal and an inertial measurement unit (IMU), so as to achieve the navigation and positioning of the existing smart mower. However, this solution generally has a relatively low positioning accuracy and cannot achieve real-time positioning and navigation, and efficient path planning and complete regional coverage are difficult to perform. The application of positioning solutions with high accuracy, such as a real-time kinematic positioning (RTK) solution based on satellite signals or an ultra-wideband (UWB) solution based on radio signals is limited due to the hardware cost and system reliability of these solutions. In addition, it is far from enough for an autonomous smart mower to obtain high-accuracy positioning regardless of the cost, and due to the lack of a depth understanding of the surrounding environment, the mower cannot cope with complex situations such as roads, obstacles, and lighting.

SUMMARY

To solve the deficiencies in the related art, the main object of the present application is to provide a smart mower with a higher positioning accuracy and a deeper understanding of the surrounding environment.

To achieve the preceding object, the present application adopts the technical solutions described below.

A smart mower includes a camera for collecting image data of the environment around the smart mower; an IMU for detecting pose data of the smart mower; a memory at least used for storing an application program for controlling the smart mower to work or travel; and a processor for calling the application program, fusing the image data collected by the camera and the pose data acquired by the IMU, performing simultaneous localization and mapping (SLAM) of the smart mower, and generating a navigation or mowing action instruction.

Optionally, the smart mower further includes a body, where the camera is mounted to the body.

Optionally, the camera is mounted on the front side of the body.

Optionally, the application program is capable of distinguishing between grassland and non-grassland according to a feature point of a two-dimensional (2D) plane in the image data and a texture feature of the grassland for comparison and automatically generating a mowing region boundary with a boundary line between the grassland and the non-grassland as discrete anchor points through visual-inertial fusion SLAM.

Optionally, the smart mower further includes a cutting blade, where the application program is capable of distinguishing between grassland and non-grassland according to a feature point of a 2D plane in the image data and a texture feature of the grassland for comparison and when a current workplane is not the grassland, stopping rotating the cutting blade.

Optionally, the application program is capable of determining a type of a current workplane according to a feature point of a 2D plane in the image data and a texture feature of a common type of ground preset by the application program for comparison and when the current workplane includes multiple ground types, controlling the smart mower to travel to the ground with greater hardness among the multiple ground types.

Optionally, the application program further includes an object recognition program and the application program is capable of selecting a corresponding obstacle avoidance strategy according to an obstacle category recognized by the object recognition program.

Optionally, the smart mower further includes a GPS sensor, where the application program uses a positioning result of the GPS sensor to filter and correct a result of visual-inertial fusion SLAM.

Optionally, the smart mower further includes a light, where the application program is capable of acquiring a light intensity of the current environment according to the image data and when the light intensity is less than a first light intensity threshold, turning on the light.

A smart mower includes a body; a camera for collecting image data of the environment around the smart mower; a support rod for supporting the camera; an IMU for detecting pose data of the smart mower; a memory at least used for storing an application program for controlling the smart mower to work or travel; and a processor for calling the application program, fusing the image data collected by the camera and the pose data acquired by the IMU, performing SLAM of the smart mower, and generating a navigation or mowing action instruction.

Optionally, the support rod is disposed on the upper surface of the body.

Optionally, the support rod is telescopic and includes a first state in which the support rod has a first length and a second state in which the support rod has a second length, where the second length is greater than the first length.

Optionally, the smart mower further includes an accommodation cavity disposed in the middle of the body and used for accommodating the support rod and the camera, where when the support rod is in the first state, the camera and the entire support rod are located within the accommodation cavity, and when the support rod is in the second state, the camera and part of the support rod are located outside the accommodation cavity.

Optionally, a waterproof and dustproof cover plate is disposed on the top of the accommodation cavity and has a closed state and an open state, where when the support rod has the first length, the cover plate is in the closed state, and when the support rod has the second length, the cover plate is in the open state.

Optionally, the cover plate is hingedly connected to an edge of the top of the accommodation cavity.

Optionally, the cover plate is slidable relative to the accommodation cavity.

Optionally, a groove for accommodating the support rod is formed on the upper surface of the body; and the support rod is fixed to the upper surface of the body by a damping rotating shaft device and includes a first state in which the support rod is placed in the groove on the upper surface of the body and a second state in which the support rod is basically perpendicular to the groove on the upper surface of the body.

A smart mowing system includes a smart mower. The smart mower includes at least a camera for collecting image data of the environment around the smart mower; an IMU for detecting pose data of the smart mower; an interactive display interface; a memory at least used for storing an application program for controlling the smart mower to work or travel; and a processor configured to call the application program, fuse the image data collected by the camera and the pose data acquired by the IMU, perform SLAM of the smart mower, and generate a navigation or mowing action instruction.

Optionally, the interactive display interface is located at the smart mower.

Optionally, the smart mowing system further includes a mobile terminal, where the interactive display interface is located at the mobile terminal.

Optionally, the memory and the processor are located at the smart mower.

Optionally, the smart mowing system further includes a mobile terminal, where the memory and the processor are located at the mobile terminal.

Optionally, a user is capable of viewing, through the interactive display interface, a real-time image collected by the camera and superimposing a virtual fence on the real-time image, and the application program adds an anchor point of the virtual fence to an anchor point set of a mowing region boundary.

Optionally, a user is capable of viewing, through the interactive display interface, a real-time image collected by the camera and superimposing a virtual obstacle on the real-time image, and the application program records an anchor point of the virtual obstacle and plans a path for bypassing the virtual obstacle.

A smart mowing system includes a smart mower and a camera disposed in a work site. The camera includes a wireless communication device for wirelessly connecting the smart mower. The smart mower includes a cutting blade for cutting grass; a body for supporting the cutting blade; at least one wheel that is rotatable and supports the body; a wireless communication device for wirelessly connecting the camera; a memory at least used for storing an application program for controlling the smart mower to work or travel; and a processor configured to call the application program for navigation and mowing control.

Optionally, the camera is disposed on a roof.

Optionally, the smart mowing system further includes a charging pile, where the camera is disposed on the top of the charging pile.

Optionally, the camera acquires image data in the work site and sends the image data to the smart mower through the wireless communication device, and the application program performs a target tracking calculation using the image data acquired by the camera to obtain a current position estimate of the smart mower and then generates a navigation or mowing action instruction according to the current position estimate.

Optionally, multiple cameras are disposed in the work site.

Optionally, the multiple cameras acquire image data in the work site from different viewing angles, obtain a current position estimate of the smart mower through a distributed target tracking calculation, and then send the position estimate to the smart mower.

Optionally, the smart mowing system further includes a cloud server, where each of the multiple cameras uploads acquired image data in the work site to the cloud server through the wireless communication device, the cloud server performs a target tracking calculation through a multi-view target tracking algorithm to obtain a current position estimate of the smart mower, and the smart mower acquires the current position estimate from the cloud server through the wireless communication device.

A smart traveling tool system includes a smart traveling device; a camera for acquiring image data of the environment around the smart traveling device; an IMU for detecting pose data of the smart traveling device; a memory at least used for storing an application program for controlling the smart traveling device to work or travel; and a processor for fusing the image data collected by the camera and the pose data acquired by the IMU, performing SLAM of the smart traveling device, and generating a navigation and working instruction.

Optionally, the smart traveling tool system further includes a mobile terminal, where the memory is located in the mobile terminal.

Optionally, the smart traveling tool system further includes a mobile terminal, where the processor is located in the mobile terminal.

Optionally, the smart traveling tool system further includes a mobile terminal, where the camera is located at the mobile terminal.

Optionally, the smart traveling tool system further includes a mobile terminal, where the IMU is located in the mobile terminal.

Optionally, the smart traveling device further includes a body, where the camera is disposed on the body of the smart traveling device.

Optionally, the smart traveling device further includes a body, where the IMU is disposed in the body of the smart traveling device.

Optionally, the smart traveling device further includes a body, where the processor is disposed in the body of the smart traveling device.

Optionally, the smart traveling device further includes a body, where a controller is disposed in the body of the smart traveling device.

Optionally, the smart traveling device further includes a body, where the camera is movable up and down relative to the body.

Optionally, the smart traveling device further includes a support rod for supporting the camera.

Optionally, the support rod is telescopic and includes a first state in which the support rod has a first length and a second state in which the support rod has a second length, where the second length is greater than the first length.

Optionally, the smart traveling device further includes an accommodation cavity disposed in the body and used for accommodating the support rod and the camera.

Optionally, the smart traveling device further includes an interactive display interface configured for a user to view a real-time image acquired by the camera and superimpose a virtual fence on the real-time image, where the application program adds an anchor point of the virtual fence to an anchor point set of a working region boundary.

Optionally, the smart traveling device further includes an interactive display interface configured for a user to view a real-time image acquired by the camera and superimpose a virtual obstacle on the real-time image, where the application program records an anchor point of the virtual obstacle and plans a path for bypassing the virtual obstacle.

Optionally, the application program is capable of determining a type of a current workplane according to a feature point of a 2D plane in the image data and a texture feature of a common type of ground preset by the application program for comparison and when the current workplane includes multiple ground types, controlling a smart mower to travel to the ground with greater hardness among the multiple ground types.

Optionally, the application program further includes an object recognition program and the application program is capable of selecting a corresponding obstacle avoidance strategy according to an obstacle category recognized by the object recognition program.

Optionally, the smart traveling device further includes a GPS sensor, where the application program uses a positioning result of the GPS sensor to filter and correct a result of visual-inertial fusion SLAM.

The benefit of the present application is as follows: visual and inertial sensors are fused so that on the one hand, a higher accuracy of positioning is obtained; and on the other hand, a deep understanding of the environment is obtained. In this manner, the smart mower has advantages during navigation, obstacle avoidance, and other operations.

BRIEF DESCRIPTION OF DRAWINGS

FIG. 19A is a side view of a fixture of a smart mower shown in FIG. 18;

FIG. 19B is a side view of a retracted clamp of the fixture of the smart mower shown in FIG. 19A;

FIG. 19C is a side view of an extended clamp of the fixture of the smart mower shown in FIG. 19A;

FIG. 21A is a schematic view of an IMU of a mobile terminal in a smart mowing system according to another example of the present application;

FIG. 21B is a schematic view of a camera of a mobile terminal in a smart mowing system according to another example of the present application;

FIG. 21C is a schematic view of an interface of a mobile terminal in a smart mowing system according to another example of the present application;

DETAILED DESCRIPTION

The present application is described below in detail in conjunction with drawings and examples.

Figures 1, 2:
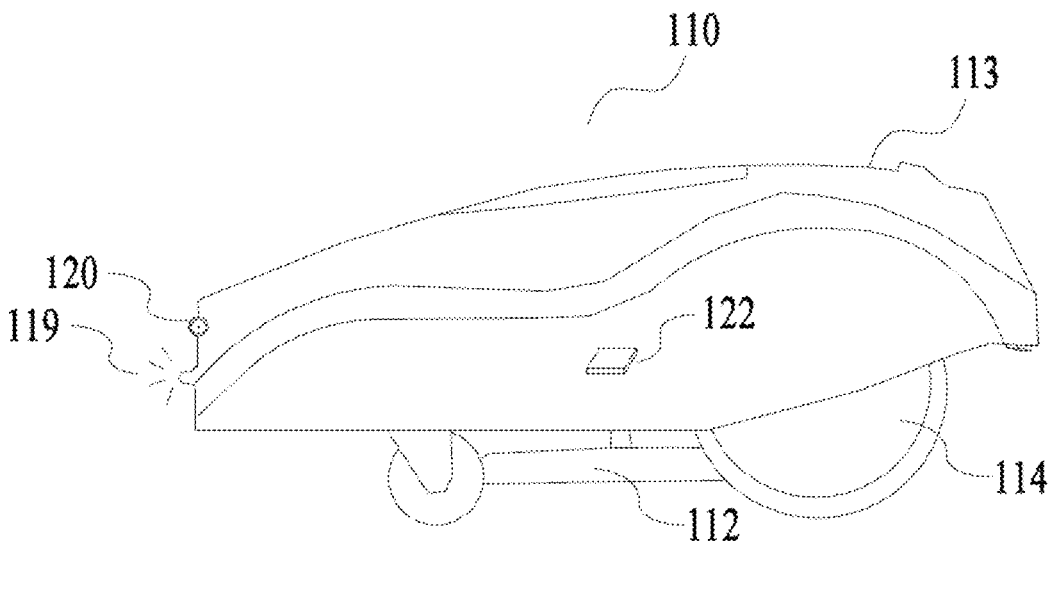
FIG. 1 is a side view of a smart mower according to an example of the present application.
FIG. 2 is a side view of a smart mower according to an example of the present application.

As shown in FIG. 1, the present application proposes a smart mower 110. The smart mower 110 includes a cutting blade 112 for cutting grass; a body 113 to which the cutting blade 112 is mounted; a wheel 114 that is rotatable and supports the body 113; a light 119 for illuminating; a camera assembly 120 for collecting image information about the environment around the mower; an IMU 122 for collecting pose information about the mower; a processor electrically connected to the camera assembly 120 and the IMU 122 and used for calculating and processing information collected by the camera assembly 120 and the IMU 122; and a memory for storing a control program 145 that controls the operation of the smart mower 110. The processor may call the control program 145 to fuse the image information about the environment around the mower collected by the camera assembly 120 and the pose information data of the mower collected by the IMU 122 to achieve the SLAM of the mower and generate a corresponding navigation or mowing action instruction according to a preset logic and real-time data to control the behavior of the smart mower 110.

Optionally, referring to FIG. 1, the camera assembly 120 may be mounted on a front portion of the smart mower 110. The camera assembly 120 mounted on the front portion of the mower 110 can better collect image information about the environment in front of the smart mower 110. Compared with the image information of the side and rear of the mower, the image information of the front of the mower has more reference values in navigation and obstacle avoidance. Optionally, as shown in FIG. 2, the camera assembly 120 may be mounted over the front of the mower through a bracket 123. Lifted by the bracket 123, the camera assembly 120 has an increased vertical distance from the ground so that the field of view of the camera assembly 120 increases and the line of sight is less likely to be obstructed by near-ground obstacles such as weeds.

Figure 3A:
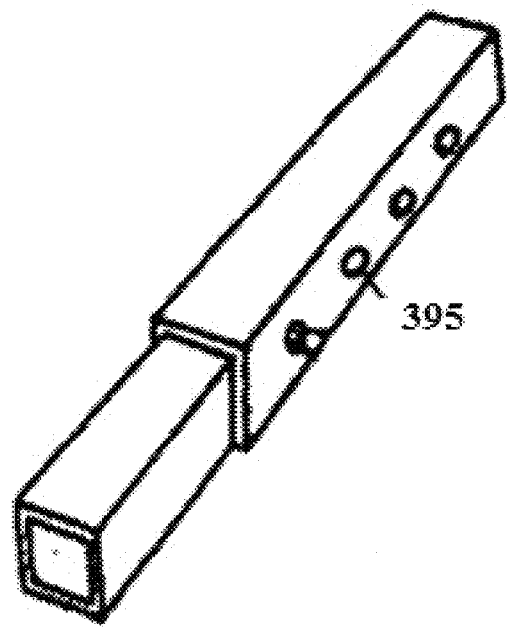
FIG. 3A is a perspective view of a telescopic bracket of a camera of the smart mower shown in FIG. 2.
Figure 3B:
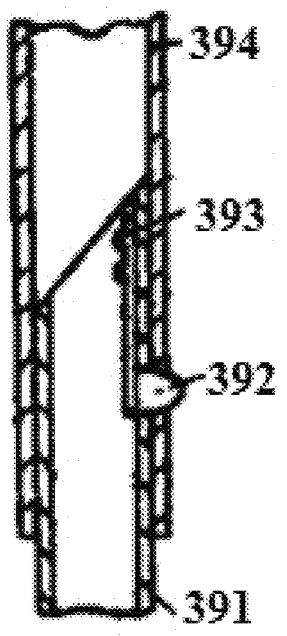
FIG. 3B is a sectional view of the telescopic bracket of the camera of the smart mower shown in FIG. 3A.
Figure 3C:
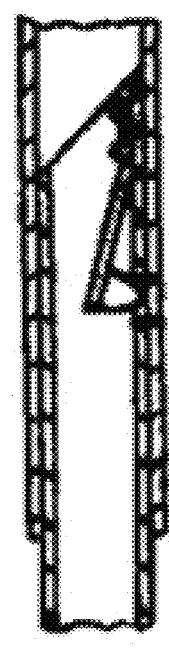
FIG. 3C is a sectional view of the telescopic bracket of the camera of the smart mower shown in FIG. 3A during telescopic translation.

Optionally, the bracket 123 is a telescopic device. The bracket 123 shown in FIGS. 3A to 3C consists of a telescopic sleeve. A tubular body portion of the telescopic sleeve includes inner and outer hollow tubes, and a wire of the camera assembly 120 penetrates through a cavity between the two tubes. An outer tube 394 has multiple holes 395 arranged in sequence along a length direction of the outer tube 394. An inner tube 391 is provided with a hole. A pin 392 with a rounded head is disposed in a cavity of the inner tube 391 in a direction perpendicular to the hole in the inner tube 391. The pin 392 is connected to a spring contact 393. One end of the spring contact 393 is fixed on an inner wall of the inner tube 391, the other end of the spring contact 393 is connected to the bottom of the pin 392, and the spring contact 393 always provides an outward force to the pin 392 so that the head of the pin 392 protrudes outward through the hole in the inner tube 391 when not pushed by other external forces. When the outer tube 394 is sleeved on the inner tube 391, one of the multiple holes 395 arranged in sequence in the outer tube 394 is aligned with the hole in the inner tube 391. When not pushed by other external forces, the head of the pin 392 sequentially penetrates through the hole in the inner tube 391 and the hole 395 in the outer tube 394 that is aligned with the hole in the inner tube 391 and protrudes outward to latch the outer tube 394 relative to the inner tube 391. Adjustment of the length of the bracket 123 is achieved by changing the position of the outer tube 394 of the pin 392 telescopic sleeve relative to the inner tube 391. First, the head of the pin 392 is pushed into the inner tube 391 against the force of the spring contact 393; and when the head of the pin 392 is substantially in the same plane as the hole 395 in the outer tube 394, the outer tube 394 is rapidly slid to a desired position, and another hole 395 in the outer tube 394 is aligned with the hole in the inner tube 391 so that the pin 392 is naturally released until the head protrudes through the hole in the inner tube 391 and another hole 395 in the outer tube 394 that is aligned with the hole in the inner tube 391. In this case, the pin 392 fixes the outer tube 394 at a new position relative to the inner tube 391. The telescopic bracket 123 facilitates adjustment of the position of the camera assembly 120 while enhancing protection for the camera assembly 120 and extending the operating life of the camera assembly 120. The bracket 123 may also be telescopic by other structures. Alternatively, rather than a purely mechanical structure, the telescopic structure is an electro-mechanical combination and electrically connected to the processor of the smart mower 110, and the processor can autonomously adjust, according to the image information collected by the camera assembly 120, the length of the bracket 123 to adjust the height of the camera assembly 120. The present application does not limit the specific examples. As long as the bracket 123 of the camera assembly 120 is telescopic, the bracket 123 falls within the scope of the present application.

Figures 4A, 4B:
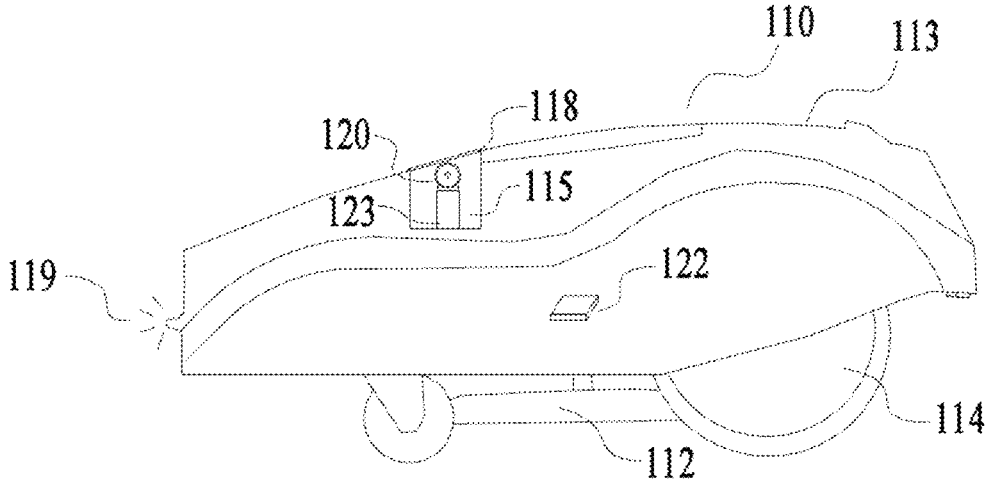
FIG. 4A is a side view of a smart mower in a non-working state according to an example of the present application.
FIG. 4B is a side view of the smart mower shown in FIG. 4A in a working state.

Further, referring to FIGS. 4A and 4B, in cooperation with the telescopic bracket 123, the body 113 of the smart mower 110 may be provided with an inward recessed accommodation cavity 115. A top opening of the accommodation cavity 115 is located on the upper surface of the body 113 of the mower, the bracket 123 is fixed in the accommodation cavity 115 by a fastening mechanism such as a screw and a nut, and a cover plate 118 is disposed on the top of the accommodation cavity 115 and can be opened and closed. For example, the cover plate 118 is hinged to one side of the top opening of the accommodation cavity 115 and includes a first position at which the cover plate 118 is opened (FIG. 4B) and a second position at which the cover plate 118 is closed (FIG. 4A). Alternatively, the cover plate 118 is composed of a slide cover slidable back and forth and a slide cover guide rail and includes a first position at which the cover plate 118 covers the top opening of the accommodation cavity 115 and a second position at which the cover plate 118 exposes the opening of the accommodation cavity 115. The advantage of the accommodation cavity 115 and the cover plate 118 mating with the telescopic bracket 123 is that when the smart mower 110 is not in use, the bracket 123 is shortened, the cover plate 118 is closed, and the camera assembly 120 is hidden and stored in the body 113 of the mower so that on the one hand, the smart mower 110 is relatively neat and beautiful; and on the other hand, the camera assembly 120 is waterproof, dustproof, and light-proof, thereby reducing the frequency of cleaning the camera and slowing down the aging of the camera assembly 120. Before the operation of the smart mower 110, the cover plate 118 is opened and the bracket 123 is lengthened so that the camera assembly 120 extends out of the accommodation cavity 115 of the smart mower 110 to collect images around the smart mower 110. The specific forms of the accommodation cavity 115 and the cover plate 118 are not limited in the present application. In addition, the specific position of the accommodation cavity 115 may be determined according to the positions of an electric motor, a printed circuit board (PCB), and other devices of the smart mower 110, so as to facilitate the collection of the image information around the smart mower 110, and the effect on the arrangement of various elements inside the body 113 of the smart mower 110 should be minimized, which is not limited in the present application. FIGS. 4A and 4B are merely an example illustration.

Figure 5A:
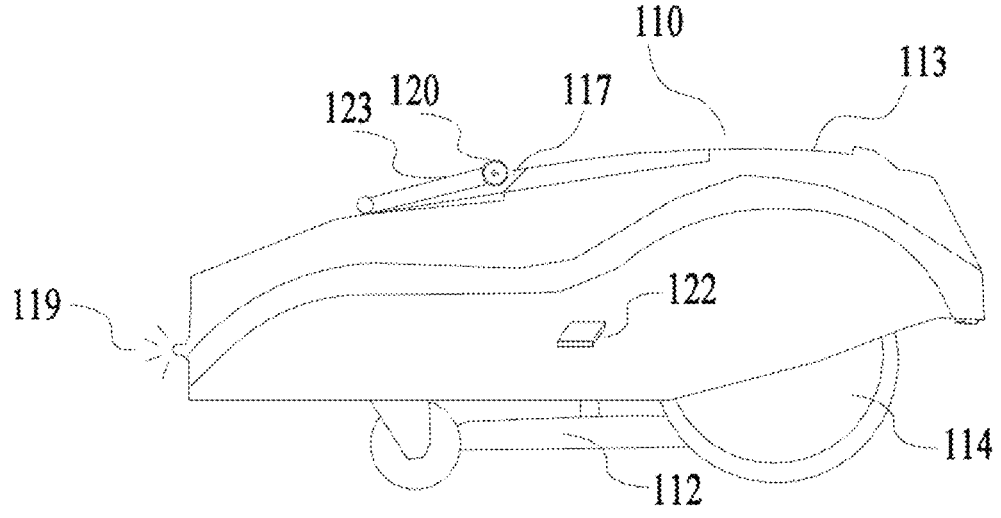
FIG. 5A is a side view of a smart mower in a non-working state according to an example of the present application.
Figure 5B:
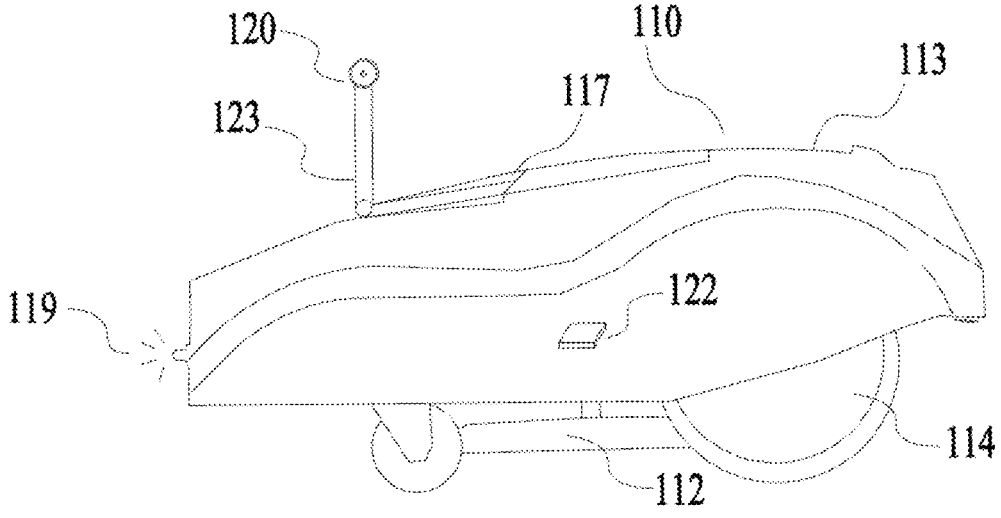
FIG. 5B is a side view of the smart mower shown in FIG. 5A in a working state.

In addition, the bracket 123 may also be configured in a foldable configuration. Referring to FIGS. 5A and 5B, a groove 117 for accommodating the bracket 123 and the camera assembly 120 is disposed on the upper surface of the body 113 of the smart mower 110. The bracket 123 is hinged to a point on the top surface of the body 113 of the smart mower 110 so that moved by human hands, the bracket 123 overcomes a certain frictional force and is rotatable around a rotation point (that is, the hinge point). As shown in FIG. 5A, during the non-working time, the bracket 123 is rotated to a flat position around the rotation point and stored in the groove 117 on the top surface of the body 113 of the smart mower 110 so that the aesthetics and neatness are improved, the space required to be occupied when the smart mower 110 is stored is reduced, the protection for the camera is enhanced, and the operating life of the camera is extended. As shown in FIG. 5B, during the working time, the bracket 123 stands up, and a standing angle of the bracket may be adjusted as required. Furthermore, a rotatable connection mechanism such as a damping rotating shaft structure and a ball structure may be used between the bracket 123 and the camera assembly 120 so that a user can freely adjust the angle of the camera assembly 120 as required before starting the smart mower 110. Alternatively, rather than a purely mechanical structure, the rotatable connection mechanism is an electromechanical combination and electrically connected to the processor of the smart mower 110, and the processor can autonomously adjust the angle of the camera assembly 120 according to the image information collected by the camera assembly 120. It is to be noted that the preceding telescopic, foldable, and rotatable designs of the bracket 123 of the camera assembly 120 are all examples, the bracket 123 of the camera assembly 120 is not limited to the specific constructions in the examples, and the scope of the present application should not be limited according to the examples.

The camera assembly 120 may include a single camera or two (multiple) cameras. A monocular camera is different from a binocular camera or a multiocular camera in the principle of distance measurement. The binocular camera or the multiocular camera resembles the human eyes and determines the distance mainly through the calculation of the parallax of two (more) images separately collected by two (multiple) cameras at the same time. Therefore, the binocular camera or the multiocular camera can perform depth estimation without relying on other sensing devices when the binocular camera or the multiocular camera is stationary. However, the depth range and accuracy are limited by the baseline (the distance between optical centers of two cameras) and resolution of the binocular camera, and the calculation of the parallax is quite resource-intensive, resulting in the disadvantages of a complex configuration, a large calculation amount, and high energy consumption. An image frame collected by the monocular camera is a 2D projection of a three-dimensional (3D) space, and depth information of the environment is lost. Only when the camera is moved, the distance can be calculated by the parallax formed by the movement of an object in the image. This disadvantage can be alleviated to some extent by fusing pose data collected by the IMU. For example, the monocular vision-inertial system (VINS-Mono) algorithm, due to its low cost, small size, and low power consumption, is widely used in robots, drones, and other devices that rely on the positioning. VINS-Mono can calculate the movement and rotation of the camera according to an offset of a feature point between the front and rear frames captured by the camera and by fusing the IMU data. Unlike a GPS sensor, VINS-Mono is not limited by signal interference. Therefore, the specific number of cameras included in the camera assembly 120 is not strictly limited in the present application.

In addition to the conventional monocular camera, binocular camera, and multiocular camera, the camera assembly 120 may also include a depth camera, also known as an RGB-D camera. The biggest feature of the RGB-D camera is that the RGB-D camera can measure the distance between an object and the RGB-D camera by actively emitting light to the object and receiving the returned light like a laser sensor through the principle of infrared structured light or time-of-flight (ToF). The RGB-D camera obtains depth through a physical measurement manner, saving a lot of calculations compared to the binocular camera or the multiocular camera that performs calculations through software. The RGB-D cameras commonly used today are Kinect from Microsoft Corporation, RealSense from Intel Corporation, and the like. However, limited by the accuracy and measurement range of the sensor, the depth camera has many problems, such as a narrow measurement range, large noise, a small field of view, easy to be disturbed by sunlight, and inability to measure transmissive materials. Therefore, the depth camera is usually applied in indoor scenarios more than outdoor scenarios. If the RGB-D camera is to be used on the smart mower 110, fusion with other sensors is required, and the RGB-D camera is suitable for use when sunlight exposure is not strong.

The IMU 122 includes at least an accelerometer and a gyroscope. The accelerometer is a sensor for measuring linear acceleration. When the rigid body is at rest relative to the earth, the linear acceleration is 0. However, due to the influence of gravity, when the linear acceleration of the rigid body is measured using the accelerometer, the reading is about 9.81 m/s$^2$ on an axis pointing vertically downward to the center of the earth. Similarly, under the action of gravity, when the reading of the accelerometer on the rigid body is 0, the rigid body is in free fall and has an actual acceleration of 9.81 m/s$^2$ vertically downward. A micro-electromechanical system (MEMS) sensor is widely used in smart home appliances. An accelerometer of the MEMS has a spring-mass block microstructure inside so that when there is acceleration on a deformation axis of the micro spring-mass block, the micro spring is deformed. The acceleration on the axis may be measured by measuring the deformation of the micro spring through microelectronics. Due to such a structure, the accelerometer of the MEMS cannot measure the actual acceleration of the rigid body but only gives an acceleration measurement value along a measurement axis. In practice, three MEMS measurement systems are usually used to form an orthogonal three-axis measurement system together and separately measure acceleration components of the actual acceleration on three orthogonal measurement axes, and the actual acceleration is calculated through the acceleration components on the three orthogonal measurement axes. The gyroscope is a sensor for measuring the angular velocity of the rotating rigid body. Similar to the accelerometer of the MEMS, the gyroscope of the MEMS can only measure the angular velocity component of rotation around a single measurement axis. Therefore, when in use, a three-axis gyroscope with three orthogonal measurement axes is integrally packaged to separately measure rotational components of the angular velocity of the rotating rigid body on the three measurement axes and finally obtain the resultant actual angular velocity of the rotating rigid body. In a typical x-y-z coordinate system, it is specified that an angle of rotation about the x-axis of the reference coordinate system is a roll angle, an angle of rotation about the y-axis of the reference coordinate system is a pitch angle, and an angle of rotation about the z-axis of the reference coordinate system is a yaw angle.

Figure 6:
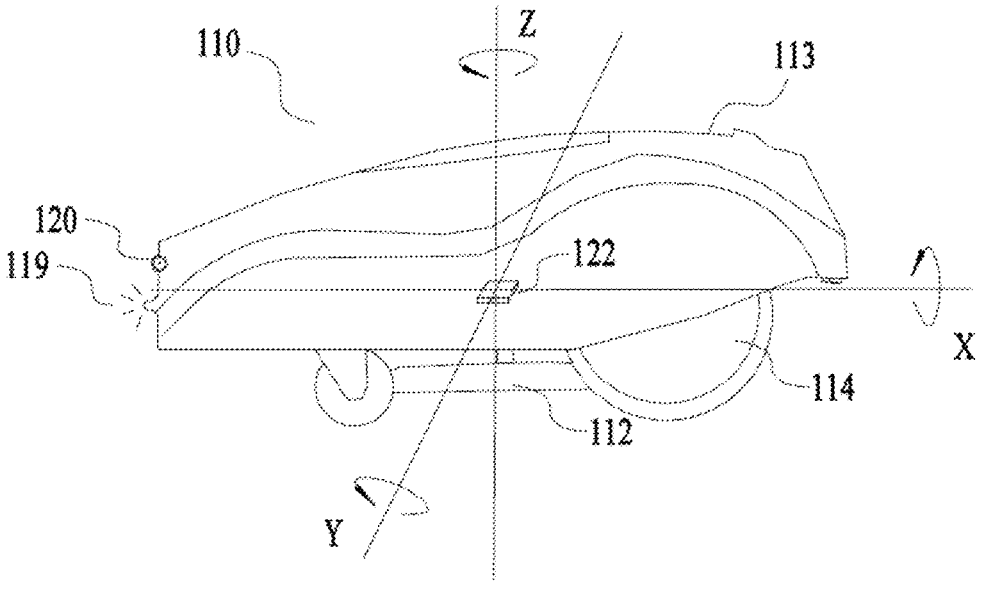
FIG. 6 is a schematic view of an IMU of the smart mower shown in FIG. 1.
Figure 7:
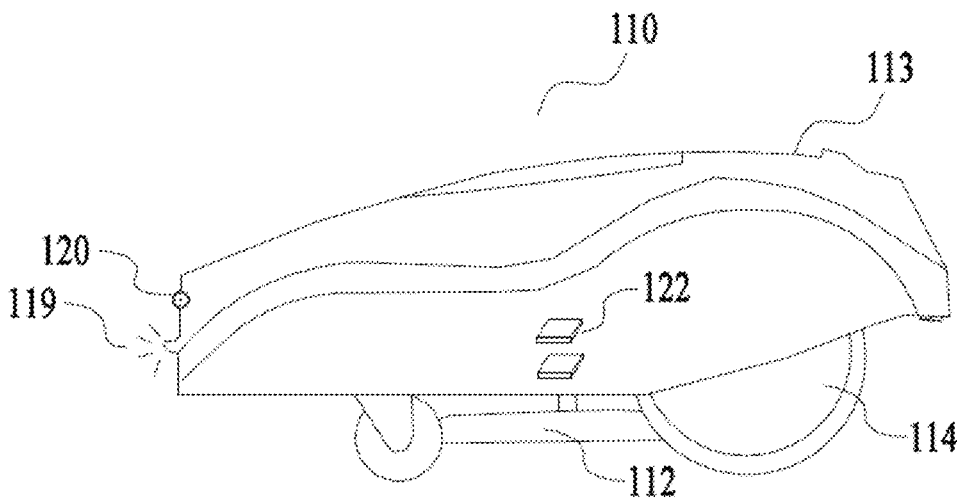
FIG. 7 is a schematic view of two IMUs of the smart mower according to an example of the present application.

Generally, the IMU 122 includes three single-axis accelerometers and three single-axis gyroscopes, measures the angular velocity and acceleration of an object in the 3D space, and calculates the pose of the object based on the angular velocity and acceleration. Further, the IMU 122 may include a magnetometer. The magnetometer is also referred to as a geomagnetic sensor or a magnetic sensor and is used for testing the strength and direction of a magnetic field and positioning the orientation of a device. The principle of the magnetometer is similar to that of a compass. The magnetometer can measure the angles between the current device and four directions (east, south, west, and north). A six-axis or nine-axis sensor is used as an integrated sensor module, thereby reducing the circuit board space and the overall space. In addition to the accuracy of the device, the data accuracy of the integrated sensor also involves the correction after the welding and assembly and matching algorithms for different applications. A suitable algorithm can fuse data from multiple sensors, making up for the deficiencies of a single sensor in calculating the accurate position and direction. In general, the IMU sensor is preferably set at the center of gravity of the object. Therefore, optionally, as shown in FIG. 6, the IMU 122 may be set at the center of gravity G of the smart mower 110. Due to the low cost of the IMU 122, in an example, as shown in FIG. 7, two IMUs 122 may be provided to improve the accuracy and stability of the IMU data. On the one hand, the relative angular velocity and relative acceleration between a target object and a motion reference system may be obtained according to the difference of the outputs of the two IMUs 122; on the other hand, states of the two IMUs 122 are monitored in real time, and when one IMU 122 is abnormal, the system is switched to the other IMU 122 immediately so that the redundant design of the two IMUs 122 ensures the positioning stability.

Figure 8:
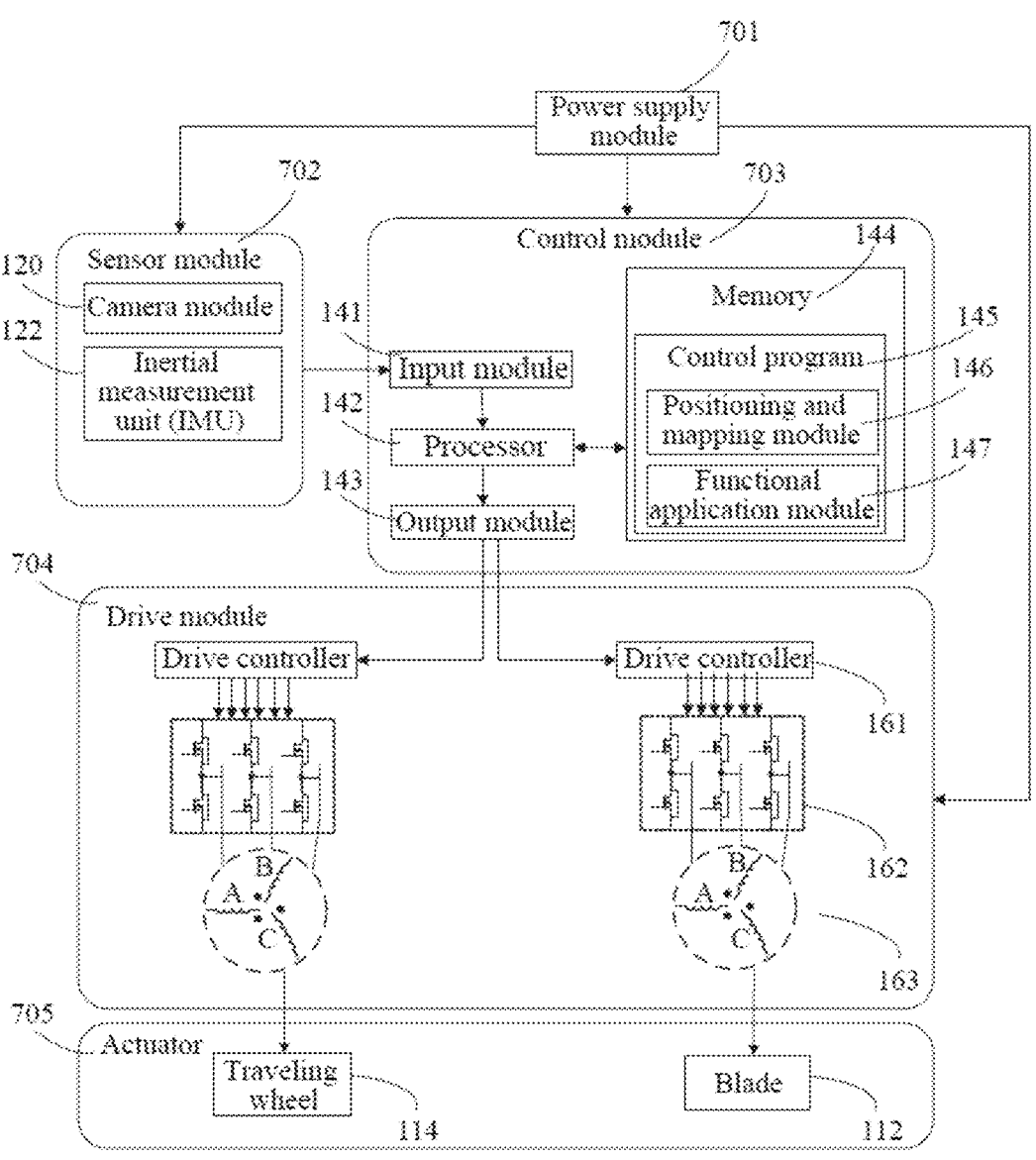
FIG. 8 is a schematic diagram illustrating a system of a smart mower according to an example of the present application.

A diagram of a system of the smart mower 110 is shown in FIG. 8. The system of the smart mower 110 includes a power supply module 701, a sensor module 702, a control module 703, a drive module 704, and an actuator 705. The power supply module 701 supplies power to the drive module 704, the control module 703, and the sensor module 702. To satisfy the working requirements of autonomous movement of the smart mower 110, optionally, the power supply module 701 includes a battery pack to provide a direct current. The sensor module 702 includes at least the camera assembly 120 and the IMU 122. The smart mower 110 may also be equipped with other sensors, such as the GPS sensor, a crash sensor, and a drop sensor. Information collected by other sensors may be integrated for reference in a calculation process. The control module 703 includes an input module 141 for receiving various raw data collected or detected by the sensor module 702; a processor 142 that is used for logic operation and may be a central processing unit (CPU) or a microcontroller with a higher data processing speed; a memory 144 for storing various data and control programs 145; and an output module 143 for converting a control instruction into an electric motor drive command and sending the electric motor drive command to a drive controller 161 of an electric motor drive switch. The drive module 704 includes an electric motor drive switching circuit 162, the drive controller 161, and an electric motor 163. The most common metal-oxide-semiconductor field-effect transistor (MOSFET) switch is used in the electric motor drive switching circuit 162 shown in FIG. 8, and the drive controller 161 controls the MOSFET switch to be turned on or off by applying a voltage to a gate of the MOSFET switch. The sequential on and off of the MOSFET switch cause the motor windings to be turned on and off sequentially, thereby driving the electric motor 163 to rotate. FIG. 8 illustrates only one common electric motor driver circuit, and this disclosure does not limit the specific examples of the electric motor driver circuit. The electric motor 163 rotates to drive the actuator 705 directly or indirectly through a transmission mechanism. The actuator 705 of the smart mower 110 generally includes the blade 112 and the wheel 114. Optionally, the blade 112 and the wheel 114 are driven by separate electric motors 163. Optionally, each of the left and right rear wheels 114 may be driven by a separate electric motor 163, so as to achieve more flexible turning and pose adjustment. The control program 145 stored in the memory 144 is mainly composed of two modules, that is, a positioning and mapping module 146 and a functional application module 147, where the positioning and mapping module 146 is the basis of the functional application module 147. The positioning and mapping module 146 solves the basic problems of where the smart mower 110 is, what a map is, and how the surrounding environment is, tracks the position of the smart mower 110 when the smart mower 110 moves, and constructs an understanding of the real world, that is, the SLAM. Based on the solutions to the basic problems, the functional application module 147 can implement specific functions such as mowing region boundary delineation, smart obstacle avoidance, road recognition and selection, a navigation combination, and smart lighting. This classification is mainly to facilitate understanding and elaboration. In the specific implementation, the positioning and mapping module 146 and the functional application module 147 are not two completely separated parts, the process of implementing the functional application module 147 deepens the understanding of the real world, and a result is fed back to the positioning and mapping module 146, so as to continuously improve the map.

Implementation of the SLAM of the smart mower 110 requires the fusion of image data from the camera assembly 120 and the pose data from the IMU 122 (also referred to as sensor fusion). The reason for this is that a visual sensor, such as the camera, works well in most texture-rich scenarios, but is basically inoperable when encountering scenarios with few features, such as glass and white walls. Although the IMU can measure the angular velocity and acceleration, time integration must be performed to obtain the position or pose of the object; furthermore, inertial components based on the MEMS inevitably have system deviations; and the preceding two effects are superimposed for a long time, causing a very large accumulated error/drift. However, the relative displacement data of the fast motion in a short time has high accuracy. In the fast motion, the camera encounters a motion blur, or an overlapping region between two frames is so small that feature matching cannot be performed. A better pose estimate can be obtained using the IMU even in the time period when the camera data is invalid. If the camera is fixed at the current position, the pose estimate from visual information is also fixed. Therefore, in the slow motion, visual data can effectively estimate and correct the drift in the IMU reading so that the pose estimate after the slow motion is still valid. It can be seen that the complementarity between the visual data and the IMU data is strong, and the data of both the camera assembly 120 and the IMU 122 is fused so that the accuracy and stability of positioning and mapping can be improved.

Figure 9:
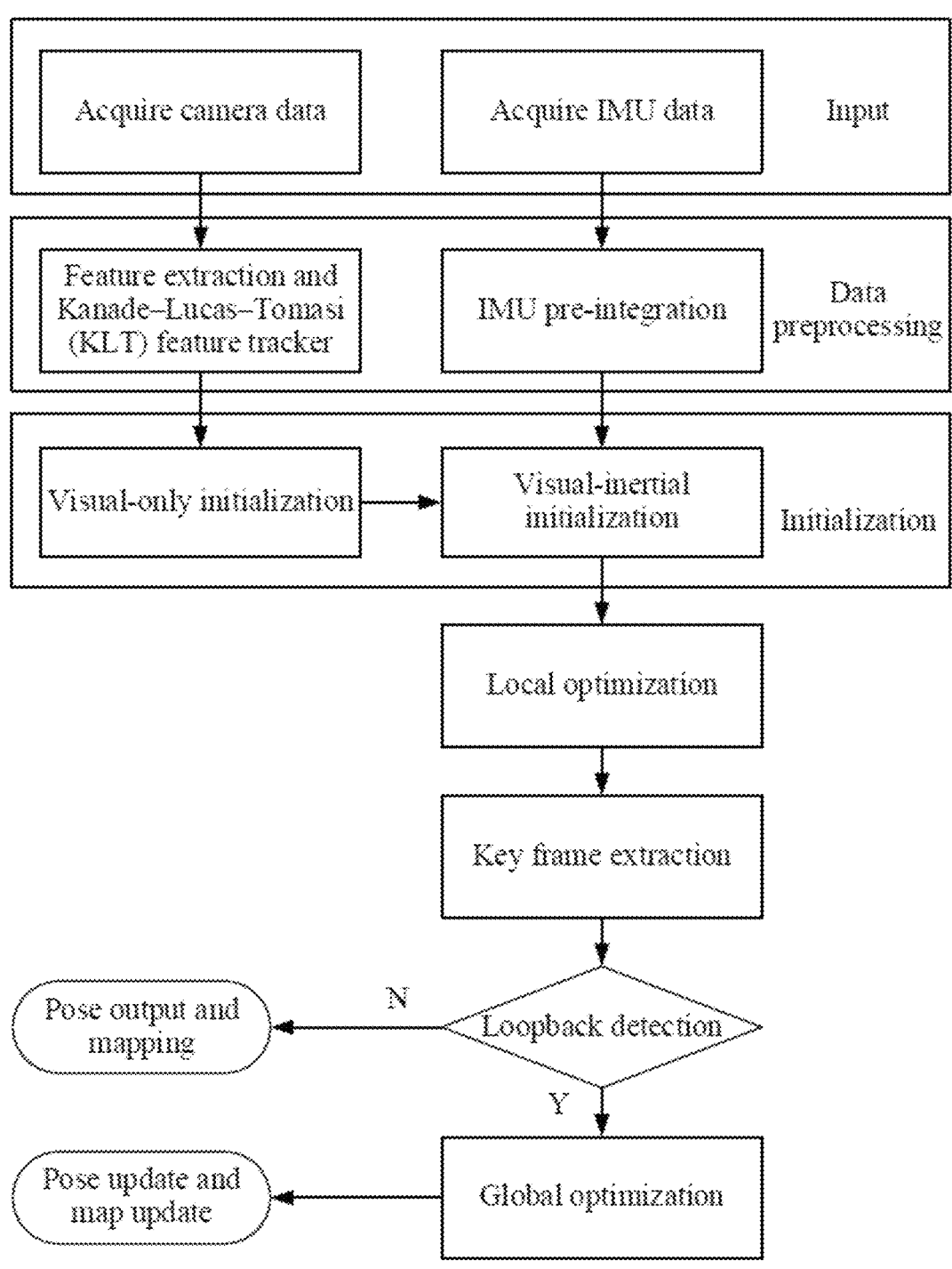
FIG. 9 is a flowchart of a simultaneous localization and mapping (SLAM) algorithm according to an example of the present application.

Types of data measured by the camera assembly 120 and the IMU 122 (the vision measures the coordinates of a projection of the object on a pixel plane, while the IMU measures the 3D acceleration and angular velocity of rotation of the object) and measurement rates of the camera assembly 120 and the IMU 122 (the vision is subject to the frame rate and the image processing speed, a sampling rate of the camera can only reach several tens of frames per second, and the IMU can easily reach a sampling rate of hundreds or even thousands of frames per second) differ greatly. Therefore, when the two types of data are fused, whether a motion quantity measured by the IMU is converted into object coordinates (accumulation of the deviation during integral) or a visual quantity is converted into a motion quantity (large-amplitude oscillations in calculated acceleration due to the positioning deviation during differential), an additional error is introduced, so detection and optimization need to be introduced in the data fusion process. In general, compared with differentiating the visual quantity, during fusion, the motion quantity detected by the IMU is integrated into the object coordinates and then fused with the visual quantity. For example, as shown in FIG. 9, the key modules in the overall flowchart may be broken down into the following sections: image and IMU data preprocessing, initialization, local optimization, mapping, key frame extraction, loopback detection, and global optimization. The main functions of the modules are described below.

Image and IMU data preprocessing: a feature point is extracted from the image frame collected by the camera assembly 120 and optical flow tracking is performed using the Kanade-Lucas-Tomasi (KLT) pyramid, so as to prepare for solving the pose of the smart mower 110 through the subsequent visual-only initialization. The pre-integration is performed on the IMU data collected by the IMU 122, so as to obtain the pose, speed, and angle of rotation at the current moment, and at the same time, the pre-integrated increment between adjacent frames to be used in the back-end optimization and the covariance matrix and Jacobian matrix of the pre-integration are calculated.

Initialization: in the initialization, the relative pose of the smart mower 110 is solved by the visual-only initialization and then is aligned with IMU pre-integration so as to solve an initialization parameter.

Local optimization: the local optimization of visual-inertial navigation is performed for a sliding window, that is, the visual constraint and IMU constraint are put into a large objective function for nonlinear optimization; the local optimization here is an optimization of only variables in the window of the current frame and the previous n frames (for example, n is 4) and outputs a more accurate pose of the smart mower 110.

Mapping: through the obtained pose, the depth of the corresponding feature point is calculated by a trigonometric method, and the current environment map is reconstructed synchronously. In the SLAM model, a map refers to a set of all landmark points. Once the positions of the landmark points are determined, the mapping is completed.

Key frame extraction: key frames are selected image frames that can be recorded and avoid redundancy, and the selection criterion of the key frames is that the displacement between the current frame and the previous frame exceeds a certain threshold or the number of matching feature points is less than a certain threshold.

Loopback detection: the loopback detection is also referred to as closed-loop detection and is to save the previously detected image key frames, and when the smart mower 110 returns to the same place where the smart mower 110 originally passed, determine whether the smart mower 110 has passed this place through the matching relationship of feature points.

Global optimization: the global optimization is a nonlinear optimization using the visual constraint and IMU constraint plus the constraint of the loopback detection when the loopback detection occurs. The global optimization is performed based on the local optimization to output a more accurate pose of the smart mower 110 and update the map.

In the preceding algorithm, the local optimization is the optimization of the image frame in the sliding window, and the global optimization is the optimization of all key frames. If only the local optimization is adopted, the accuracy is low and the global consistency is poor, but the speed is great and the utilization rate of the IMU is high. If only the global optimization is adopted, the accuracy is high and the global consistency is good, but the speed is small and the utilization rate of the IMU is low. The local optimization and the global optimization adopted in combination can complement each other and make a positioning result more accurate. The outputted pose has six degrees of freedom (DoF), which refer to the 3D motion (movement) of the smart mower 110 in the x-y-z direction plus pitch/yaw/roll (rotation). In the fusion process, the real scale of the trajectory of the smart mower 110 can be estimated by aligning a pose sequence estimated by the IMU with a pose sequence estimated by the vision, and the IMU can well predict the pose of the image frame and the position of the feature point at the previous moment in the next image frame, thereby improving the matching speed of a feature tracker algorithm and the robustness of the algorithm to cope with fast rotation. Finally, a gravity vector provided by the accelerometer in the IMU can convert the estimated position into the world coordinate system required by actual navigation.

Compared with the GPS outputting the 2D/3D position with relatively poor accuracy (in units of meters), the SLAM outputs a pose with relatively high accuracy (in units of centimeters) and 6DoF, is independent of the strength of satellite signals, and is not interfered by other electromagnetic signals. However, compared with the GPS positioning with low computation and low power consumption, the process of SLAM has the problem of high power consumption. Moreover, since the smart mower 110 works outdoors, the camera sensor needs to be cleaned frequently. If the camera sensor is not cleaned in time, the collected image frame may be blurred, and effective visual data cannot be provided. Further, to solve the SLAM problem accurately, the smart mower 110 needs to repeatedly observe the same region to implement the closed-loop motion, so the system uncertainty is accumulated until the closed-loop motion occurs. Especially when the lawn is vast with a surrounding empty space and there is a lack of feature references, the smart mower 110 performs a large closed-loop motion, and the system uncertainty possibly leads to the failure of closed-loop detection, resulting in the failure of the SLAM global optimization and a large positioning deviation. However, in the environment in which the lawn is vast with a surrounding empty space, the satellite signal interference is less, the GPS positioning result is generally more stable and accurate, and the GPS is commonly used and has a low cost, so the smart mower 110 may be equipped with the GPS sensor and may adopt GPS+SLAM combination navigation.

Figure 10:
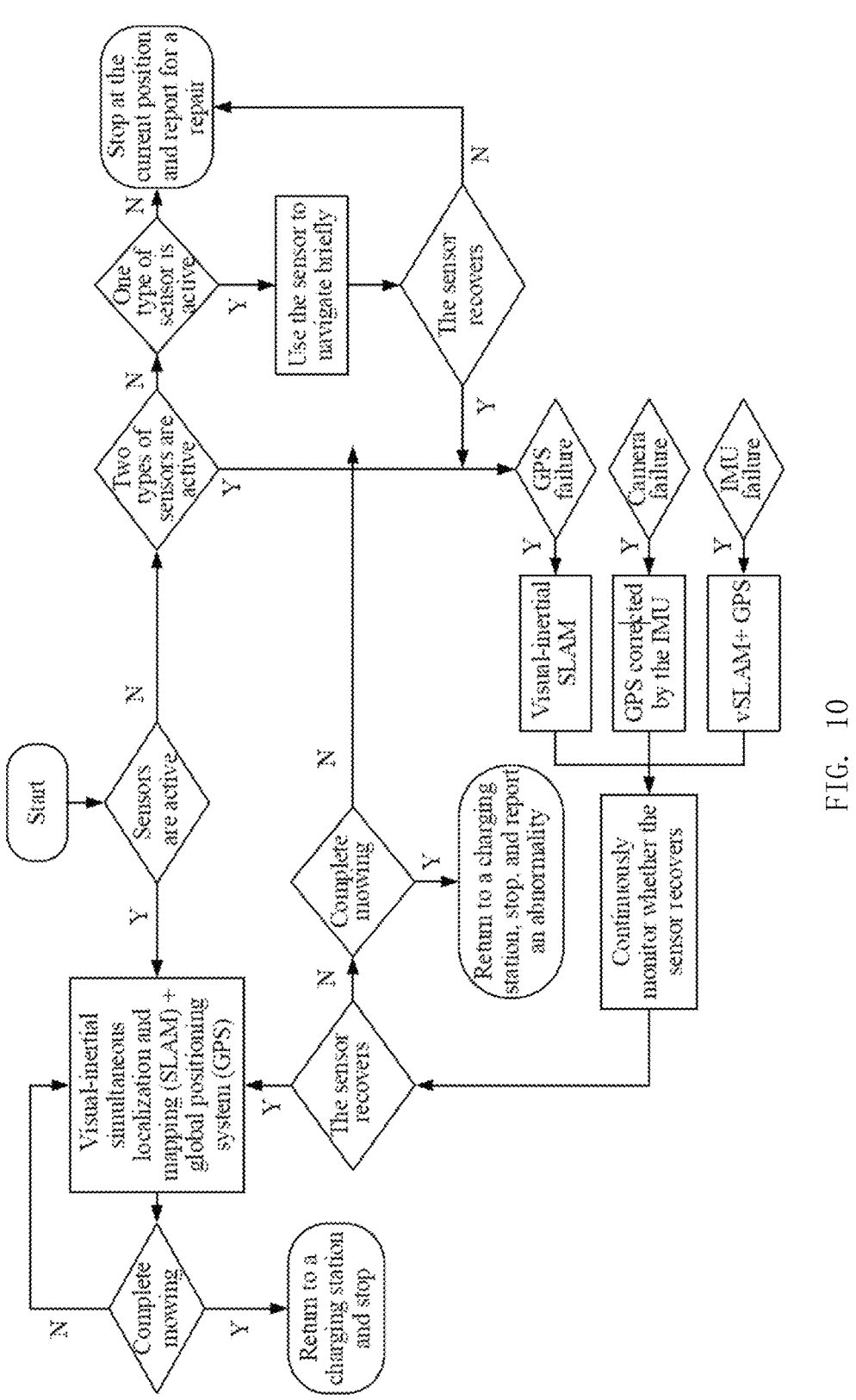
FIG. 10 is a flowchart of a sensor fusion algorithm according to an example of the present application.

For a combined positioning method composed of three types of sensors, that is, the camera assembly 120, the IMU 122, and the GPS, reference may be made to FIG. 10. The reliability of data from each sensor is determined first. When all the sensors fail, traveling is stopped and a maintenance reminder is sent. When two types of sensors fail, the remaining one type of sensor is used for positioning and navigation for a short period of time, such as 3 s, whether the data validity of the failed sensors recovers is continuously detected during this period, the data from the recovered sensors is added to the subsequent calculation of positioning and navigation, and if no other sensor recovers within this short period of time, the smart mower 110 stops at the current position and a maintenance reminder is sent. When only one type of sensor fails, the remaining two types of sensors are used for positioning and navigation; if the GPS sensor fails, an augmented reality (AR) fusion visual-inertial SLAM is used for positioning and navigation; if the camera fails, the IMU data is used to verify the self-consistency of the GPS result and filter and correct the absolute positioning data which cannot be self-consistent; if the IMU fails, visual simultaneous localization and mapping (vSLAM) is performed, after each frame of image processing, a vSLAM result and the current GPS positioning result are sent to the Kalman filter at the same time, whether the data validity of the failed sensor recovers is continuously detected, and the data from the recovered sensor is added to the subsequent calculation of positioning and navigation; and if the mowing work is completed and the sensor does not recover after the smart mower 110 returns to a charging station, then an abnormality reminder is sent. When all the three sensors work normally, the pose and environment map generated by the AR fusion visual-inertial SLAM is filtered and corrected using the GPS positioning result.

In practical applications, the process of SLAM may be implemented through an open-source AR software package, and different application programming interfaces (APIs) are called to implement rich functions. For example, ARCore is a software platform used for building AR application programs and launched by Google LLC, is based on the fusion of the image data and the IMU data to implement the SLAM, and has three following major functions for the integration of virtual content and the real world seen through the camera: 1. motion tracking: enabling a machine to understand and track the position and pose of the machine relative to the real world; 2. environmental understanding: enabling the machine to detect various types of surfaces (for example, horizontal or vertical surfaces, such as the ground, desktop, and wall) and know the boundaries, sizes, and positions of the surfaces through feature point clustering; and 3. lighting estimation: enabling the machine to estimate a current lighting condition of the environment. In addition to ARCore of Google LLC, ARKit of Apple Inc. and AR Engine of Huawei can also provide software packages with similar functions.

Figure 11A:
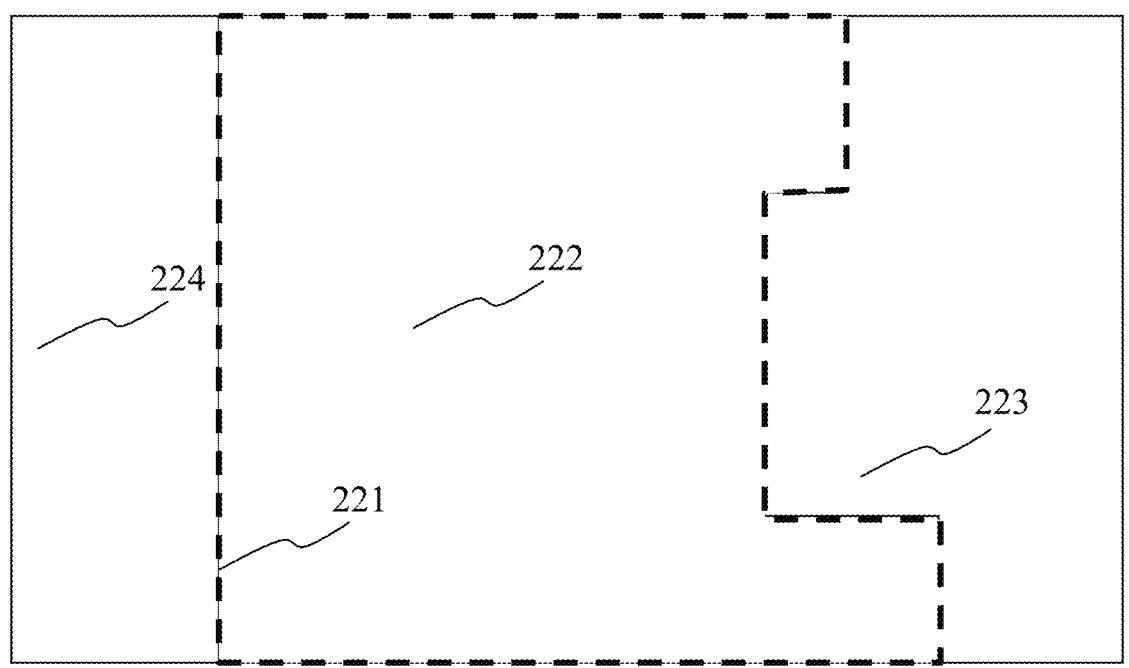
FIG. 11A is a display interface in a boundary recognition mode according to an example of the present application.
Figure 11B:
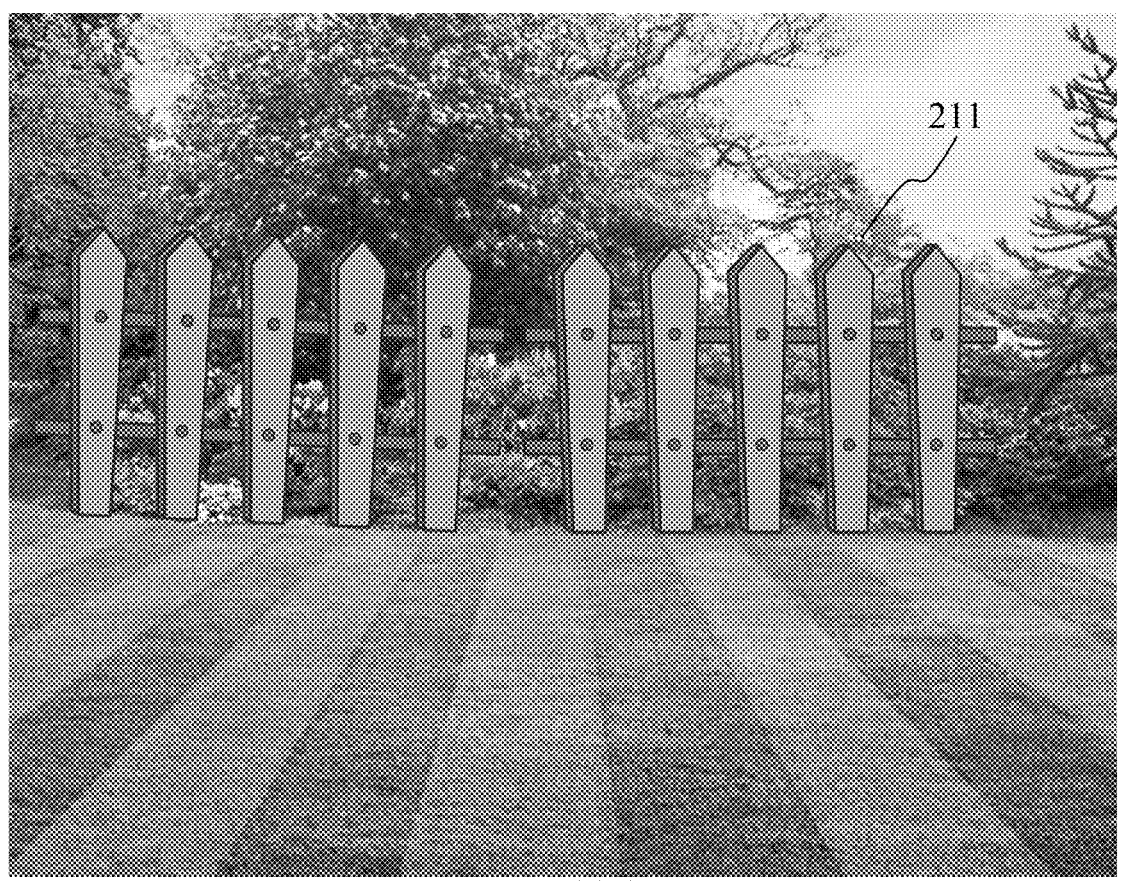
FIG. 11B is a display interface in another boundary recognition mode according to an example of the present application.

In an example, the functional application module 147 of the control program 145 of the smart mower 110 may distinguish between grassland and non-grassland according to a feature point of a 2D plane in the image frame and a texture feature of the grassland for comparison, stop rotate the blade 112 when a current workplane where the smart mower is located is not the grassland, and autonomously generate a mowing region boundary along a boundary line between the grassland and the non-grassland in conjunction with a motion tracking function of ARCore and other software packages. Further, the smart mower 110 may mate with an interactive display interface to display the constructed map and mowing region boundary through the interactive display interface and allow the user to determine or modify the constructed map and mowing region boundary. During determination, two recognition modes may be set to make it easier for the user to recognize the boundary line more visually and carefully. Referring to FIG. 11A, one recognition mode is to display the boundary line of the mowing region in a 2D map on the interactive display interface. In the 2D map, a lawn 222 is located between a house 223 and a road 224, and a boundary line 221 of the mowing region is indicated by a thick dashed line. The user may manually adjust the boundary line 221 in the 2D map on the interactive display interface, for example, by dragging a certain section of the boundary line 221 up and down or left and right or by deleting or adding (using fingers to draw) a certain section of the boundary line 221. The user may choose to enter this recognition mode directly as desired to draw the entire boundary line 221 in the 2D map on the interactive display interface with fingers. The other recognition mode is to superimpose an icon of a virtual fence 211 on a real image collected in real time by the camera assembly 120 and displayed on the interactive display interface. Referring to FIG. 11B, in this recognition mode, the boundary line automatically generated by the smart mower 110 is displayed in the form of the icon of the virtual fence 211, and the user may manually adjust the position of the icon of the virtual fence 211 superimposed on the real image on the interactive display interface, for example, by pulling the virtual fence 211 closer or pushing the virtual fence 211 farther away, or by deleting and adding a section of the virtual fence 211. Moreover, with the motion tracking function of ARCore and other software packages, the user may detect the appropriateness of the virtual fence 211 from various angles as the camera assembly 120 moves and switches angles. Compared with the boundary line 221 on the 2D map, the icon of the virtual fence 211 superimposed on the real image is more visual and accurate and it is convenient for the user to determine the accurate position of the virtual fence 211 (that is, the boundary line) according to specific ground conditions (for example, the topography and vegetation type). During confirmation, the user may combine the two modes, that is, the user first views whether the whole boundary line on the 2D map conforms to the expectation, adjusts the boundary line that does not conform to the expectation, views the icon of the virtual fence 211 superimposed on the real image at the boundary to which special attention needs to be paid, and refines the boundary if necessary. When the mowing region boundary is determined by the user, the smart mower 110 stores the determined boundary line (including the virtual fence 211) in the form of coordinates of discrete anchor points, the position of the boundary line (discrete anchor points) does not change with the movement of the smart mower 110, and the smart mower 110 is restricted to work within the mowing region boundary during path planning. It is to be noted that the interactive display interface may be a component on the smart mower 110, a separate display device, or an interactive display interface of a mobile terminal such as a mobile phone and a tablet that can perform data interaction with the smart mower 110.

Figure 12:
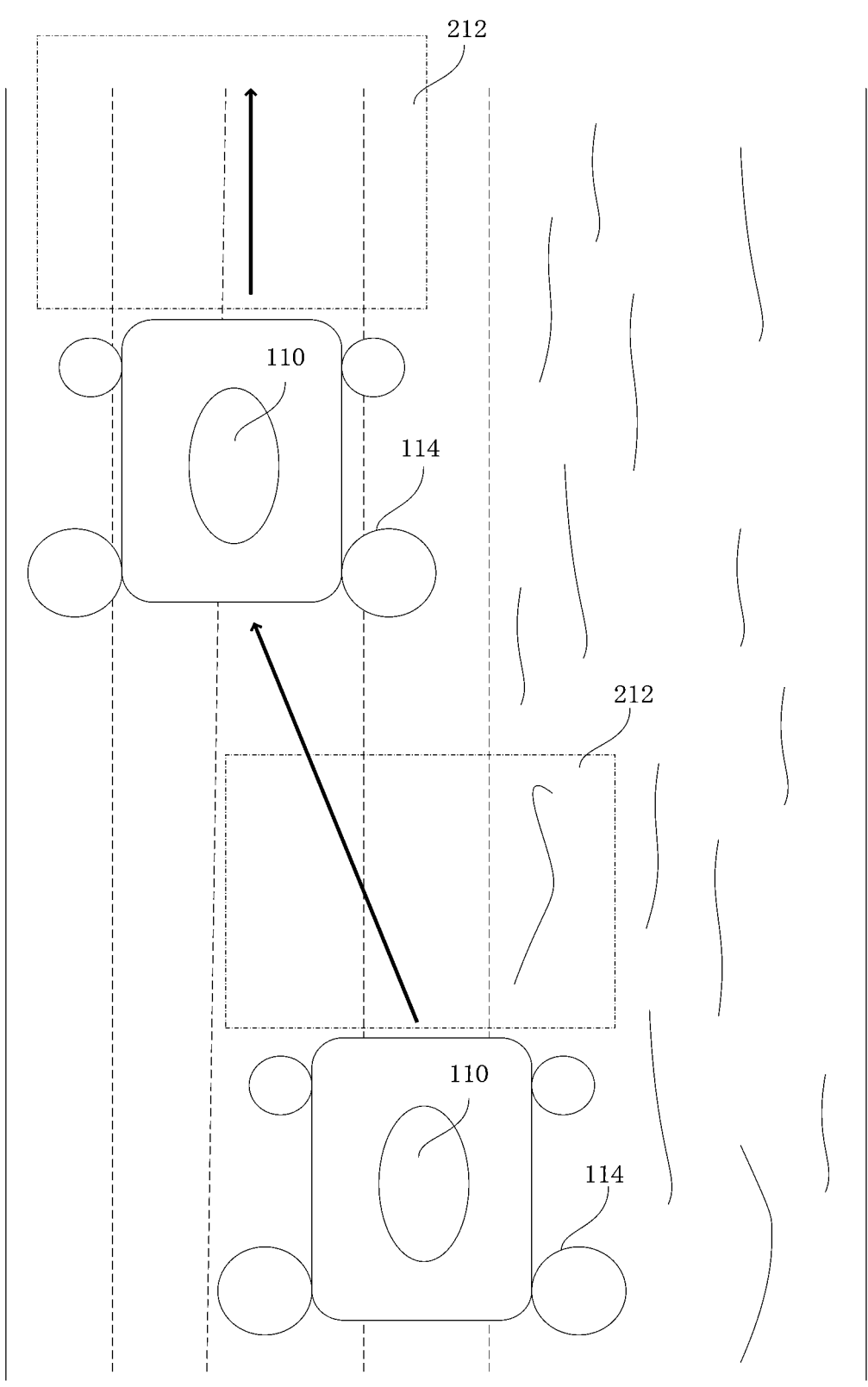
FIG. 12 is a schematic view of a road recognition and selection function according to an example of the present application.

In an example, the functional application module of the control program 145 of the smart mower 110 may identify materials of different surfaces. In addition to identifying lawns and non-lawns, the smart mower 110 may also analyze feature points of the 2D plane in the image frame collected by the camera assembly 120 and identify different types of ground (including a water surface) according to the difference in surface textures (that is, a distribution rule of feature points), with reference to the texture features of common types of surfaces predefined in the control program 145. If the smart mower 110 travels across the grounds of different materials at the same time, since the grounds of different hardness and materials apply different support forces and frictional forces to the wheel 114 of the smart mower 110, the smart mower 110 may be caused to be on a bumpy ride, tilt, travel in a skewed direction, or encounter other problems. Therefore, when the smart mower 110 travels on the non-lawn, for example, on the way from one lawn to another, and multiple types of grounds having different feature point textures (that is, different hardness) are identified in a region 212 directly in front of the smart mower 110, then the smart mower 110 selects and travels on one of the grounds having relatively large hardness. Referring to FIG. 12, the smart mower 110 detects multiple types of roads in the region 212 directly in front of the smart mower 110, where the multiple types of roads include a concrete road located on the left side and a dirt road located on the right side. A road selection program of the control program 145 plans a path and controls the smart mower 110 to adjust the direction and travel to the left front until the concrete road is detected in an entire region 128 directly in front of the smart mower 110, and then the smart mower 110 adjusts the direction and travels in the originally determined direction. This type of road selection is beneficial to the travel control, machine maintenance, and safety guarantee of the smart mower 110. In the road selection program, surfaces of different materials may be distinguished through an environment understanding function of ARCore and other software packages, and the texture features of common surfaces may be introduced for comparison, so as to assist the smart mower 110 to determine the type of the ground. After the type of the ground is determined, according to a ground type-hardness comparison table stored in the memory, the ground with greater hardness is selected and the traveling direction of the smart mower 110 is controlled according to the ground with greater hardness. In addition, through comparison with the texture feature of the common plane and determination of a positional relationship between planes, the smart mower 110 can identify the terrain such as the water surface, step, and cliff that may cause the smart mower 110 to have a risk of falling and being damaged so that the function of automatically generating the mowing region boundary is more perfect.

Figure 13A:
FIG. 13A is a schematic view of an obstacle recognition function according to an example of the present application.
Figure 13B:
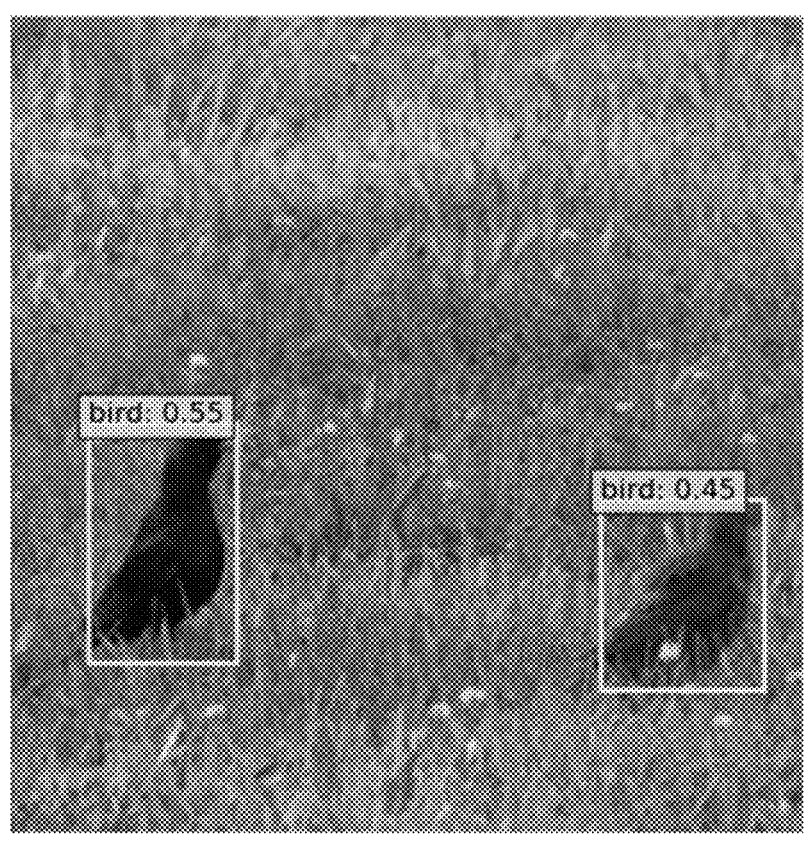
FIG. 13B is another schematic view of an obstacle recognition function according to an example of the present application.

In an example, the functional application module of the control program 145 of the smart mower 110 may further include an artificial intelligence (AI) object recognition program that calculates category information of an obstacle from the image data acquired by the camera assembly 120 to implement the active smart obstacle avoidance of the smart mower 110. In this manner, different obstacle avoidance strategies and appropriate avoidance distances are adopted for different categories of obstacles, thereby balancing the mowing coverage and the obstacle avoidance success rate. As shown in FIGS. 13A and 13B, for an object selected by a box, the object recognition program outputs a category and a corresponding confidence level (C: P), where the confidence level P ranges from 0 to 1. The control program 145 may further include a confidence threshold P1, for example, P1=0.7. A determination, for example, (bird: 0.99) shown in FIG. 13A, greater than the confidence threshold is adopted, and the obstacle avoidance strategy is to be selected. A determination, for example, (bird: 0.55) and (bird: 0.45) shown in FIG. 13B, less than or equal to the confidence threshold is not adopted. In this case, if the distance D between the obstacle and the smart mower 110 is greater than a recognition threshold distance D3, the smart mover 110 continues traveling normally, performs object recognition using images in the next frame or the next n frames, and waits for the control program 145 to make an object recognition determination with a higher confidence level when the smart mower 110 approaches the obstacle. If the distance D between the obstacle and the smart mower 110 is less than or equal to the recognition threshold distance D3, a long-distance avoidance strategy is adopted, for example, the smart mower 110 bypasses the obstacle at a distance of 0.5 m and travels.

Figure 14:
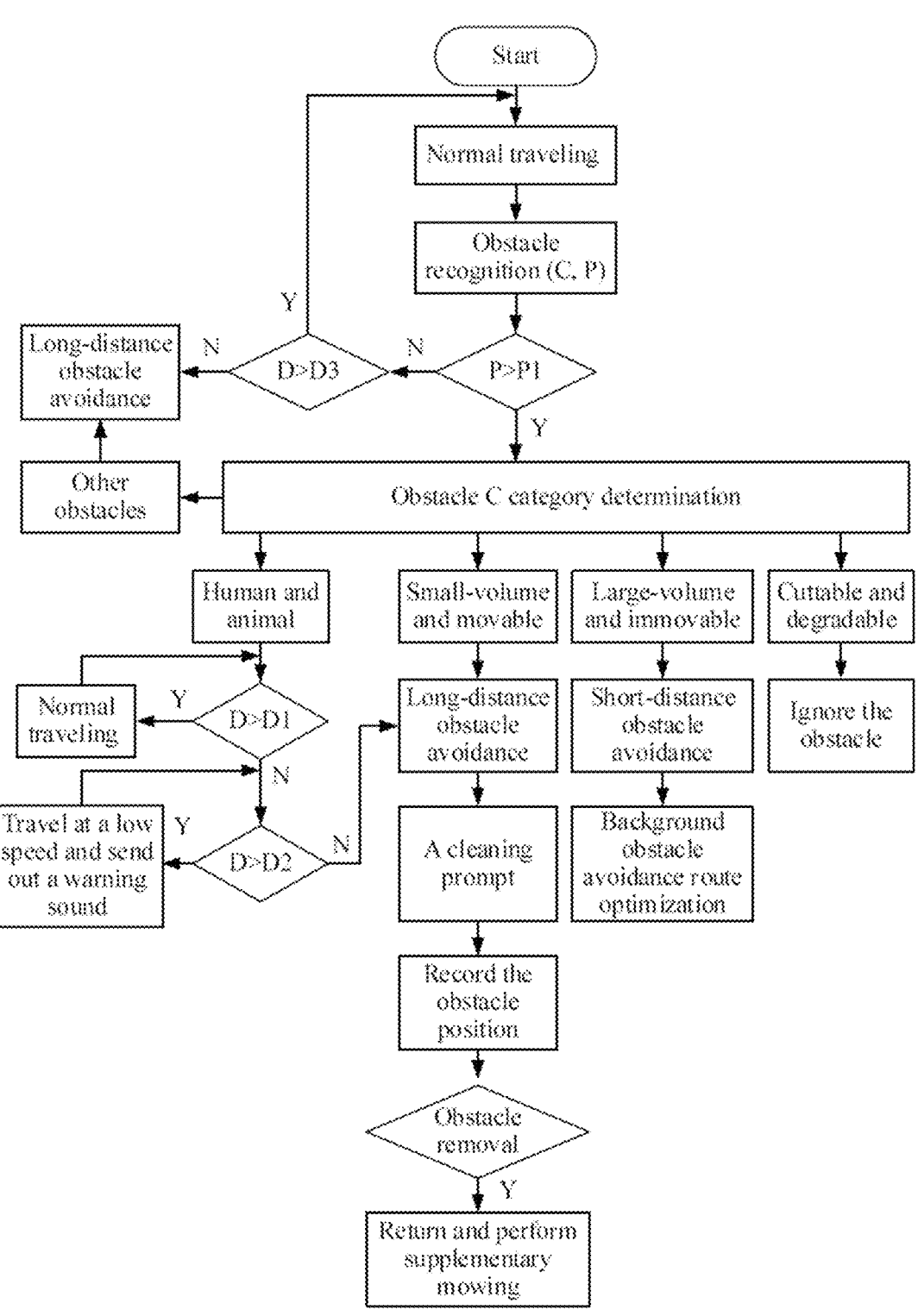
FIG. 14 is a flowchart of an obstacle avoidance algorithm according to an example of the present application.

As shown in FIG. 14, different obstacle avoidance strategies are adopted according to categories of obstacles. If the detected obstacles are fallen leaves, branches, pine nuts, and even animal wastes that are cuttable by the blade 112 and naturally degradable, the smart mower 110 may ignore the obstacles and travel according to the original path. Although the animal wastes are likely to foul the blade 112 and chassis of the smart mower 110, similar to soil, the dirt is more or less cleaned during frequent cuts, so avoidance is not required. If the detected obstacle is an animal, such as a person, a bird, a squirrel, or a dog, a first threshold distance D1 and a second threshold distance D2 may be preset. When the distance D between the smart mower 110 and the detected animal obstacle is greater than the first threshold distance D1, the smart mower 110 travels normally according to the original path. When the distance D between the smart mower 110 and the detected animal obstacle is less than or equal to the first threshold distance D1 and greater than the second threshold distance D2, the smart mower 110 slows down and sends out a warning sound to prompt the animal such as the person, the bird, the squirrel, or the dog to notice the smart mower 110 and actively avoid the smart mower 110. When the distance D between the smart mower 110 and the detected animal obstacle is less than or equal to the second threshold distance D2, the long-distance avoidance strategy is adopted so as to avoid inadvertent injury to the human and animal. If the detected obstacle is a movable (temporary) and small-volume item such as a plastic toy, a shovel, or a rope, to avoid inadvertent damage to the small-volume item, the smart mower 110 may keep a certain distance away, or adopt the long-distance avoidance strategy and send out a cleaning prompt to the user to prompt the user to clean the small-volume item on the lawn. In addition, for the animal obstacle and movable (temporary) obstacle, the smart mower 110 may store obstacle coordinates and avoidance region coordinates while taking an avoidance action. If the image data collected by the camera assembly 120 shows that the obstacle at the obstacle coordinates has been removed before the mowing is completed, a return path is planned and supplementary mowing is performed on the previous avoidance region. If the detected obstacle is an immovable (permanent) and large-volume item such as a tree or garden furniture (for example, a bench or a swing), the smart mower 110 may adopt a short-distance avoidance strategy, that is, slow down and approach the obstacle as close as possible to maximize the mowing coverage, for example, bypass the obstacle at a distance of 0.1 m and travel, or when the smart mower 110 is equipped with a crash sensor, a slight collision at a slow speed does not cause any damage to these large-volume items, so avoidance at the smallest distance can be achieved by the crash sensor. At the same time, the smart mower 110 may store the actual avoidance path and optimize the actual avoidance path when the processor 142 is idle so that the next time the smart mower 110 avoids the same obstacle, the efficiency of the avoidance path is improved while the mowing coverage is maintained.

Figure 15:
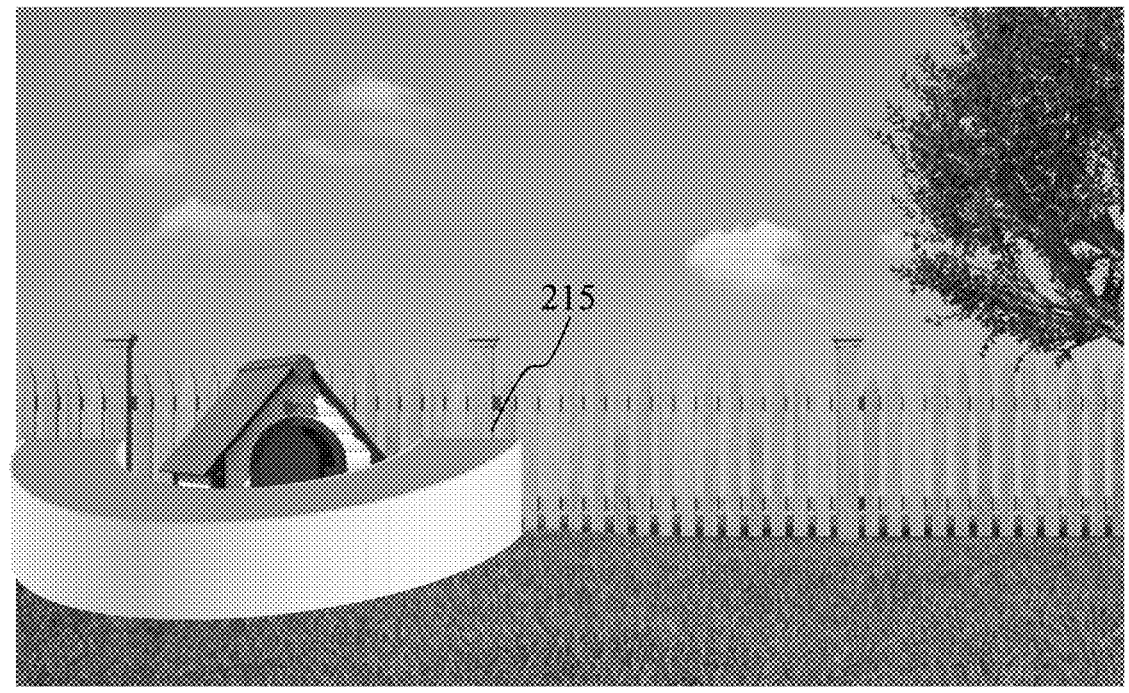
FIG. 15 is a display interface when a virtual obstacle is provided according to an example of the present application.

As shown in FIG. 15, in addition to identifying a real obstacle from an image acquired by the camera assembly

120, the user may also manually superimpose a virtual obstacle 215 on the real image collected in real time by the camera assembly 120 and displayed on the interactive display interface and adjust the orientation, dimension, and size of the virtual obstacle 215. With the motion tracking function of ARCore and other software packages, the user may detect the appropriateness of the virtual obstacle 215 from various angles as the camera assembly 120 moves and switches angles. The position and size information of the virtual obstacle 215 is recorded as the anchor point, and the virtual obstacle 215 does not change as the smart mower 110 moves. In this manner, when traveling in a real working region, the smart mower 110 may compare the current position of the smart mower 110 with position information of the virtual obstacle 215 in real time, perform obstacle avoidance, and avoid a "collision" with the virtual obstacle 215. The function of the virtual obstacle 215 makes it convenient for the user to customize a special mowing range according to specific conditions. For example, a flower nursery without a fence exists on the lawn, and the flower nursery looks like a common lawn in some seasons; to prevent the smart mower from erroneously traveling in the flower nursery during mowing, the user may add the virtual obstacle 215 with the same base area as the actual flower nursery to a flower nursery image collected in real time by the camera assembly 120 and displayed on the interactive display interface. For another example, a dog house exists on the lawn, the dog house with a relatively large volume may be automatically determined by the control program 145 to be an immovable bulk item, and the short-distance obstacle avoidance strategy may be adopted to improve the mowing coverage. However, considering that a dog may be in the dog house, to prevent the dog from being disturbed and frightened by the operation of the smart mower 110, the user may superimpose the virtual obstacle 215 or the virtual fence 211 around the dog house image collected in real time by the camera assembly 120 and displayed on the interactive display interface, so as to enclose a non-working region with a relatively large area. Further, since ARCore tracks a trackable object such as the plane and feature point over time, it is feasible to anchor the virtual obstacle to a specific trackable object, ensuring that a relationship between the virtual obstacle and the trackable object remains stable. For example, if the virtual obstacle 215 is anchored to the dog house, then when the dog house is moved later, the virtual obstacle 215 moves with the movement of the dog house so that the user does not need to reset the virtual obstacle.

In an example, the functional application module of the control program 145 of the smart mower 110 may identify the lighting state of the surrounding environment. With a lighting estimation function of ARCore and other software packages, the smart mower 110 may know the light intensity L of the surrounding environment and adjust the light 119 of the smart mower 110 accordingly. The control program 145 may preset a first light intensity threshold L1. When the light intensity L of the surrounding environment is less than the first light intensity threshold L1, the smart mower 110 turns on the light 119 so as to supplement light. In addition, it is also feasible to set different working modes, rationally arrange the mowing time, and select different working modes according to the light intensity and direction. For example, when the light of the surrounding environment is detected to be very weak, for example, when the light intensity L of the surrounding environment is less than a second light intensity threshold L2 (L2<L1), if the user does not give a command of immediate mowing, the smart mower 110 returns to the charging station and enters a charging mode or a standby mode for the reason that the lawn is most vulnerable to fungal and pest damage when there is no light. If the user gives a command of immediate mowing, the smart mower 110 turns on the light 119 and mows in a silent mode to reduce the disturbance of the mower noise to the quiet night. When the light of the surrounding environment is detected to be very strong, for example, when the light intensity L of the surrounding environment is greater than a third light intensity threshold L3 (L3>L1), if the user does not command the smart mower 110 to mow at this time, then the smart mower 110 returns to the charging station and enters the charging mode or the standby mode for the reason that strong sunlight tends to burn the broken grass. If the user gives a command of immediate mowing, the smart mower 110 mows in a fast mode, thereby reducing the time the mower is exposed to the scorching sun and thus reducing the aging caused by ultraviolet (UV) exposure. When the light of the surrounding environment is detected to be suitable, for example, when the light intensity L of the surrounding environment is greater than or equal to the first light intensity threshold L1 and less than or equal to the third light intensity threshold L3, the smart mower 110 may mow the grass in a normal mode.

In addition to the lighting state of the environment, the image data collected by the camera assembly 120 in conjunction with an AI object recognition operation may also be used as the basis for determining the mowing time and mode selection. For example, when dew is detected on the vegetation, if the user does not give a command of immediate mowing, the smart mower 110 returns to the charging station and enters the charging mode or the standby mode for the reason that dew can reduce the cutting efficiency and even cause the smart mower 110 to have the locked-rotor, and ruts tend to be left on the wet lawn, affecting aesthetics. When frost or snow is detected on the vegetation, if the user does not give a command of immediate mowing, the smart mower 110 returns to the charging station and enters the charging mode or the standby mode for the reason that cold weather is detrimental to the recovery of the broken grass cuts.

It is worth mentioning that an AR software package such as ARCore often does not have a good object recognition capability. For example, the environment understanding function of ARCore is to detect, distinguish, and delineate a 2D surface through feature point clustering on a plane rather than determining what it is on the surface of an object through object recognition. Even though texture features of some common types of planes are introduced into the control program 145 of the smart mower 110 to assist in plane type determination, the environment understanding function is far from true object recognition. Therefore, in practice, the implementation of obstacle recognition, environment recognition, and other functions needs to rely on other AI software packages with an object recognition function, such as TensorFlow of Google LLC, where TensorFlow Lite is a set of tools that can help developers run TensorFlow models on mobile devices, embedded devices, and Internet of things (IoT) devices. TensorFlow supports device-side machine learning inference (no need to send data back and forth between the device and the server) with low latency and small binary files. The smart mower 110 may further include a wireless network connection device 150, and the work of object recognition is handed over to a cloud server 200. Since the cloud server 200 has powerful cloud storage and cloud computing functions, the training set and model may be continuously improved using the TensorFlow framework, thereby giving a more accurate determination.

In fact, when the smart mower 110 includes the wireless network connection device 150, the control program 145 may send a fusion operation of the visual data and the IMU data and even the entire operation task of the positioning and mapping module 146 and the functional application module 147 to the cloud server 200 for execution. The cloud server 200 fuses, locates, maps, and determines the uploaded data according to a preset program and generates the navigation or mowing action instruction. In this case, the control program 145 of the smart mower 110 is locally only responsible for acquiring data from the camera assembly 120 and the IMU 122, preprocessing and uploading the acquired data, and downloading instructions and outputs from the cloud server 200 without performing AR and/or AI operations with high computational complexity, thereby reducing the requirements for the processor 142 of the smart mower 110 and saving chip costs. Similarly, when the smart mower 110 includes the wireless network connection device 150, the control program 145 may also send the fusion operation of the visual data and the IMU data and even the entire operation task of the positioning and mapping module 146 and the functional application module 147 to another device capable of performing wireless data transmission with the smart mower 110, such as an application program of the mobile terminal. In this case, the control program 145 of the smart mower 110 may be understood to provide an API that implements a communication function between the smart mower 110 and the mobile terminal and defines data communication protocols and formats between the smart mower 110 and the application program of the mobile terminal. Through the API, the application program of the mobile terminal can acquire the image and pose data from the smart mower 110, generate navigation or mowing action instruction data after a series of AR and/or AI operations with relatively high computational complexity according to a preset program, and then transmit the instruction data back to the smart mower 110 through the API, thereby achieving the control of the smart mower 110 by the mobile terminal. The application program of the mobile terminal may provide parameters that can be selected and modified by the user, for example, mowing time preferences and mowing height preferences, making it convenient for the user to acquire customized smart control of the smart mower 110 according to the requirement of the user. Therefore, the API is reserved for the smart mower 110, not only reducing the requirement for the processor 142 of the smart mower 110 and saving the chip costs, but also making it convenient for the user to control the smart mower 110 through other devices.

Figure 16:
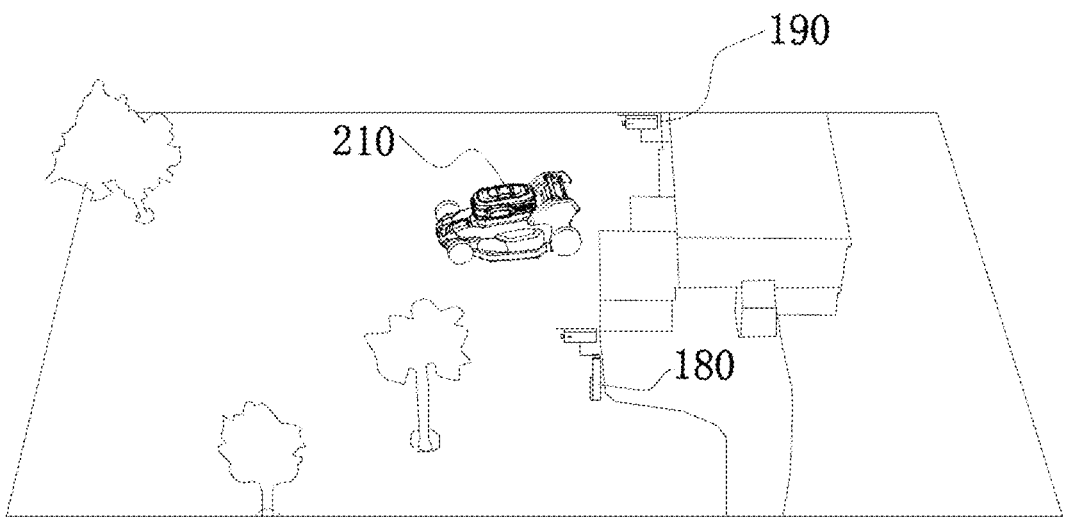
FIG. 16 is a schematic view of a smart mower and a camera provided in a site according to another example of the present application.

In another example, the camera for collecting the image information may be mounted in an environment site. For example, referring to FIG. 16, a smart mower 210 does not have a camera, and as an alternative, one or more cameras 190 are mounted on the roof and/or the top of a charging pile 180. Since there is no need to mount a bracket or reserve a storage cavity, the housing configuration of the smart mower 210 is more flexible. For example, the smart mower 210 shown in FIG. 16 uses a modern and beautiful appearance design of a power head. The one or more cameras 190 disposed in the site are each provided with a wireless connection device 191 for wirelessly connecting the smart mower 210 or connecting a wireless network, for example, the home Wi-Fi network of the user, so as to upload the acquired image data to the cloud server 200. The one or more cameras 190 may be rotatable cameras that are common on the market to achieve a wider viewing angle and more accurate positioning. The main components of the smart mower 210 are similar to those of the smart mower 110 and the same assemblies of the two mowers are not repeated here. The differences between the two mowers mainly lie in that the smart mower 210 does not have a camera that is directly disposed on the body or mounted on the body through the connection mechanism such as the bracket and moves synchronously with the smart mower 210; further, the smart mower 210 is provided with a wireless connection device 250 that can receive the image data sent by the one or more cameras 190 or can be connected to the Internet to achieve data interaction with the cloud server 200. It is to be noted that for the smart mower 110 in the preceding example, since the sensors (the camera assembly 120, the IMU 122, and the like) are integrated into the body 113 of the mower and the sensors are connected to the control module through a wired connection, a wireless connection device 150 is not necessary. However, to improve computing power, facilitate upgrading, use big data, and reduce the chip costs, the smart mower 110 may also be provided with the wireless connection device 150 such as a wireless network card or a mobile network receiver. However, for the smart mower 210 in this example, since the cameras 190 are separated from the body of the smart mower 210 and data transmission between each other depends on a wireless connection, both the one or more cameras 190 and the smart mower 210 rely on the wireless connection device (the camera 190 includes the wireless connection device 191 and the smart mower 210 includes the wireless connection device 250) to achieve wireless transmission. For example, the one or more cameras 190 separately send the collected image data to the smart mower 210 for calculation and processing.

Figure 17A:
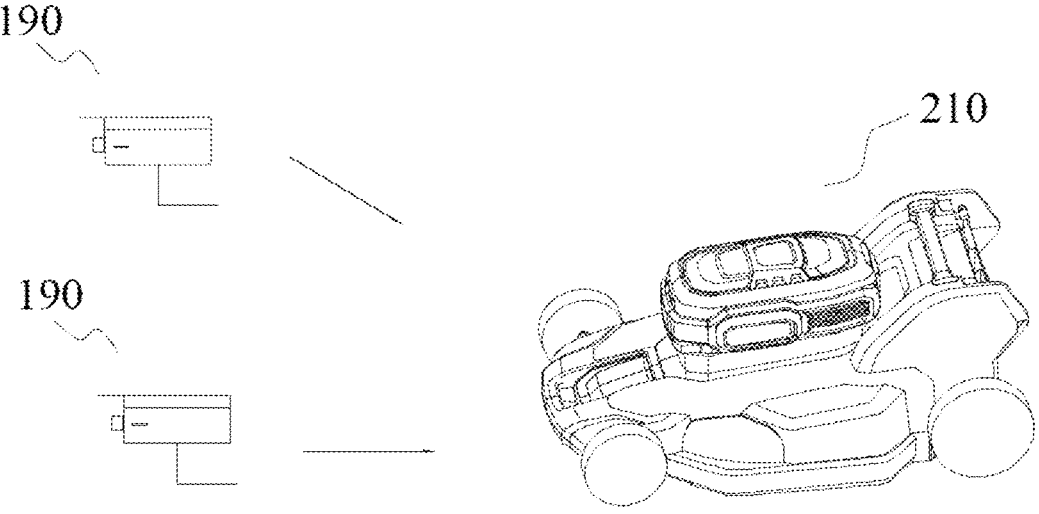
FIG. 17A is a data transmission architecture view of the smart mower and the camera provided in the site shown in FIG. 16.
Figure 17B:
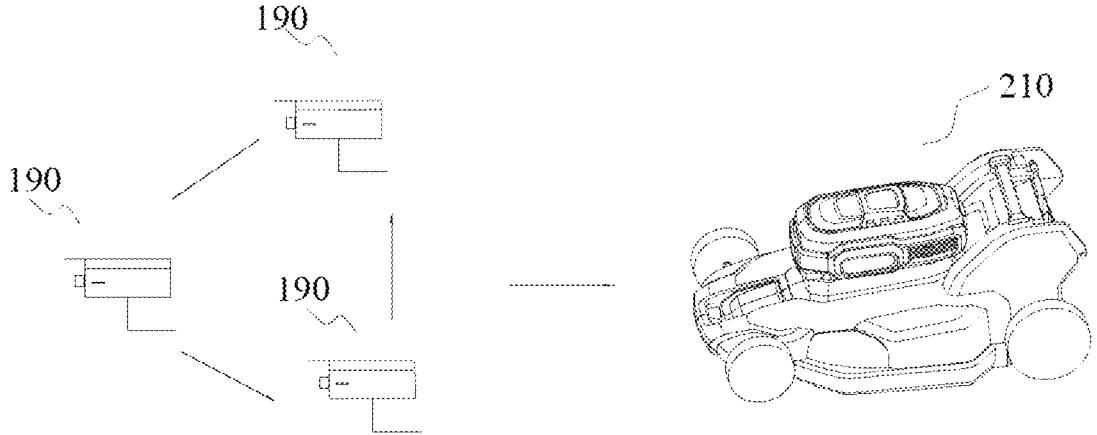
FIG. 17B is another data transmission architecture view of the smart mower and the camera provided in the site shown in FIG. 16.

For a high-level architecture of the control module of the smart mower 210, reference may be made to the smart mower 110 in the preceding example. However, since the image information collected by the one or more cameras 190 disposed in the site has a different viewing angle from the image information collected by the camera assembly 120 located on the smart mower 110, a control program 245 of the smart mower 210 is different from the control program 145 of the smart mower 110. The control program 245 of the smart mower 210 mainly uses a visual target tracking algorithm to estimate the position of the smart mower 210 in visible regions of the cameras and generate the navigation or mowing action instruction accordingly. The one or more cameras 190 may send raw image data or processed data to the smart mower 210. When only one camera 190 is provided, the control program 245 of the smart mower 210 estimates the position of the smart mower 210 by using a single-view target tracking algorithm. When multiple cameras 190 are provided, the control program 245 of the smart mower 210 estimates the position of the smart mower 210 by using a multi-view target tracking algorithm. The multi-view target tracking algorithm includes a centralized multi-view target tracking algorithm and a distributed multi-view target tracking algorithm. In the centralized technology, a data transmission mode between the multiple cameras 190 and the smart mower is shown in FIG. 17A. In the distributed technology, the data transmission mode between the multiple cameras 190 and the smart mower is shown in FIG. 17B. The smart mower 210 in FIG. 17A actually acts as a fusion center in the centralized multi-view target tracking algorithm, and each camera 190 separately sends the collected image data to the smart mower 210 for calculation and processing. In FIG. 17B, each camera 190 performs video data collection and processing locally and performs information interaction and fusion with the cameras 190 from other viewing angles through the network. For example, each camera 190 fuses a position estimate calculated from the image collected by itself and a position estimate obtained from an adjacent camera 190 to obtain a new position estimate and sends the new position estimate to the next adjacent camera 190 until the desired accuracy is achieved, and then the camera 190 that achieves the desired accuracy sends the position estimate to the smart mower 210. The control program 245 of the smart mower 210 generates the navigation or mowing action instruction according to the obtained position estimate in conjunction with information (if any) from other sensors. Compared with the centralized technology, the distributed technology has the advantages of a low bandwidth requirement, low power consumption, high real-time performance, and high reliability. The distributed multi-view target tracking algorithm reduces the requirement for a processor chip of the smart mower 210, but improves the requirement for the data processing capability of the cameras 190, and is suitable for the case of using more cameras 190 when the lawn is relatively large and the scenario is relatively complex. The centralized multi-view target tracking algorithm is suitable for the case of using fewer cameras 190 when the lawn is relatively small and the scenario is relatively simple.

Figure 17C:
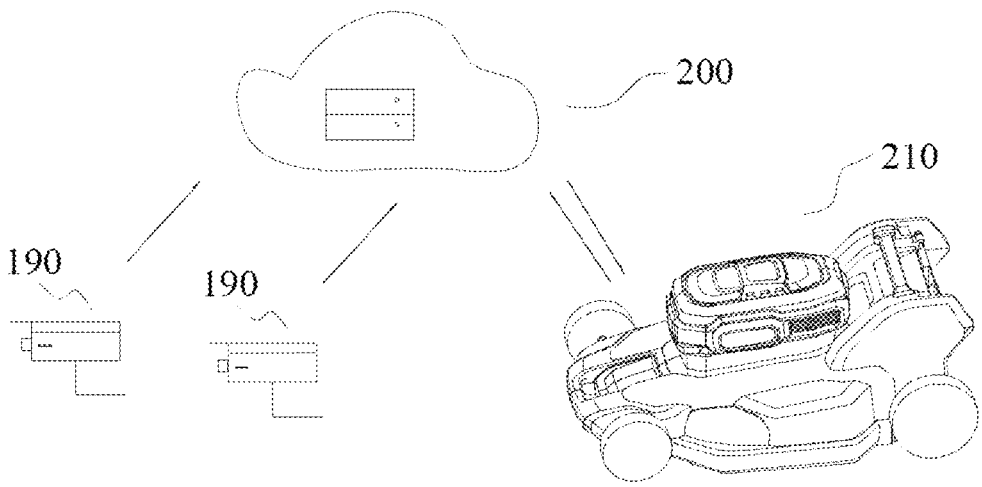
FIG. 17C is a data transmission architecture view of the smart mower and the camera provided in the site shown in FIG. 16 and a cloud server.

Alternatively, the one or more cameras 190 and the smart mower 210 are each provided with the wireless connection device 191 that can be connected to the Internet, such as the wireless network card or the mobile network receiver, and the integration calculation of data from multiple devices is implemented through the cloud server 200. The one or more cameras 190, the smart mower 210, and the cloud server 200 may perform the data interaction in an architecture shown in FIG. 17C. Each of the one or more cameras 190 uploads the collected raw image data or preprocessed data to the cloud server 200. According to the obtained data of the one or more cameras 190, the cloud server 200 selects the single-view target tracking algorithm or the multi-view target tracking algorithm; and after calculating and obtaining the real-time position estimate of the smart mower 210, the cloud server 200 sends the corresponding positioning estimate and map information to the smart mower 210, and then the control program 245 of the smart mower 210 generates the navigation or mowing action instruction in conjunction with data (if any) from other sensors. Alternatively, the smart mower 210 uploads data collected by other sensors to the cloud server 200 through a wireless network, and after calculating and obtaining the real-time position estimate of the smart mower 210, the cloud server 200 directly makes a navigation or mowing action instruction corresponding to the current situation according to a preset program stored in the cloud server 200 and the data from other sensors uploaded by the smart mower 210 and sends the navigation or mowing action instruction to the smart mower 210.

Figure 18:
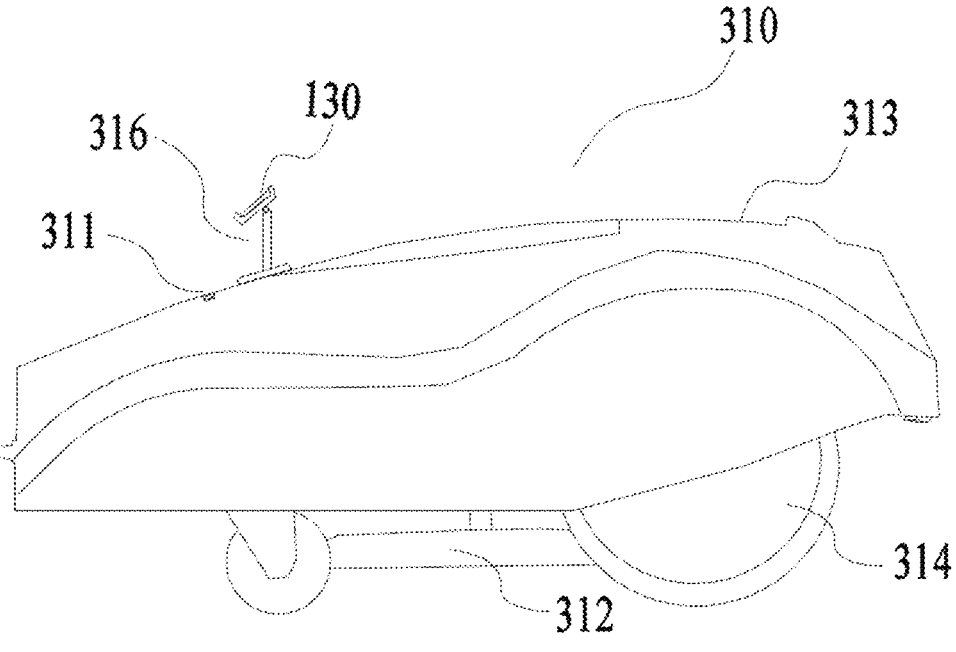
FIG. 18 is a side view of a smart mowing system according to another example of the present application.

The present application further proposes a solution with a lower cost, that is, a smart mowing system 100. The smart mowing system 100 includes a smart mower 310 and a mobile terminal 130. The mobile terminal 130 may be a device having a camera, an IMU, and a computing unit, such as a mobile phone, a tablet computer, or a bracelet. Since the mobile terminal 130 provides the camera and the IMU, the smart mower 310 does not need to include the camera or the IMU, thereby reducing production costs. Data transmission between the smart mower 310 and the mobile terminal 130 may be achieved through wired communication or wireless communication. As shown in FIG. 18, the smart mowing system 100 may employ the smart mower 310. The smart mower 310 includes a cutting blade 312 for cutting grass; a body 313 to which the cutting blade 312 is mounted; a wheel 314 that is rotatable and supports the body 313; a fixture 316 disposed on the body 313 and used for fixedly mounting the mobile terminal 130 to the smart mower 310; an interface 311 disposed on the body 313 and used for mating with an interface 131 of the mobile terminal 130 to form a wired connection to achieve data transmission; and a controller electrically connected to the interface 311 and when the interface 311 is connected to the mobile terminal 130, controlling the behavior of the smart mower 310 according to instruction data received by the interface 311.

In an example, the structure of the fixture 316 is shown in FIGS. 19A to 19C. In FIG. 19A, the fixture 316 includes a first baffle 381, a second baffle 382, a support plate 383, a support rod 384, and a base 385. The first baffle 381 and the second baffle 382 are parallel, are separately located at two ends of the support plate 383, and protrude outward from the same side of the support plate 383 to form opposite barbs so that it is convenient to fix the mobile terminal 130 such as the mobile phone or the tablet computer between the first baffle 381 and the second baffle 382. Specifically, surfaces of the support plate 383, the first baffle 381, and the second baffle 382 in contact with the mobile terminal 130 such as the mobile phone or the tablet computer are further covered with silicone liners, thereby increasing the friction forces between the support plate 383, the first baffle 381, and the second baffle 382 and the mobile terminal 130 such as the mobile phone or the tablet computer and preventing the mobile terminal 130 such as the mobile phone or the tablet computer from being shaken off due to bumps caused by uneven ground during the travel of the smart mower 310. At the same time, the silicone liners have a certain elasticity and can buffer the collision between the mobile terminal 130 such as the mobile phone or the tablet computer and the support plate 383, the first baffle 381, and the second baffle 382 during the bumpy process, thereby reducing the wear and tear of the mobile terminal 130 such as the mobile phone or the tablet computer, the support plate 383, the first baffle 381, and the second baffle 382 and improving a service life. The liner material of the support plate 383, the first baffle 381, and the second baffle 382 are not limited here, and various materials such as silicone and rubber can be used as the liner as long as the materials have an anti-skid and buffering effect.

As shown in FIGS. 19B and 19C, when the mobile terminal 130 is not mounted, the distance between the first baffle 381 and the second baffle 382 is L1. For example, to adapt to the dimension of the mobile terminal 130 such as the mobile phone or the tablet computer commonly available on the market (currently most mobile terminals such as mobile phones and tablet computers have a dimension between 4 inches and 12 inches), L1 may be 10 cm, and the distance between the first baffle 381 and the second baffle 382 may be changed. In other words, the second baffle 382 can be translated relative to the first baffle 381, or the first baffle 381 can be translated relative to the second baffle 382 so that the distance between the two baffles is changed, thereby firmly clamping mobile terminals 130 of different dimensions, such as the computers and the tablet computers. For example, a tension spring 386 and an extension rod 387 are disposed on the back of the support plate 383 so that the first baffle 381 can be translated in a direction away from or toward the second baffle 382 For ease of description, the movement of the first baffle 381 being translated in the direction away from the second baffle 382 is referred to as outward extension, and the movement of the first baffle 381 being translated in the direction toward the second baffle 382 is referred to as inward retraction. Specifically, the second baffle 382 is fixedly connected to the support plate 383 and the first baffle 381 is fixedly connected to the top end of the extension rod 387 on the back of the support plate 383 facing away from the second baffle 382. One end of the tension spring 386 is connected to the second baffle 382, and the other end of the tension spring 386 is connected to one end of the extension rod 387 facing the second baffle 382 so that the tension of the tension spring 386 always pulls the extension rod 387 toward the second baffle 382, even if the extension rod 387 retracts inward. The whole formed by the support plate 383, a telescopic mechanism, the first baffle, and the second baffle 382 may be referred to as a clamp.

When the mobile terminal 130 is not mounted, the tension spring 386 pulls the extension rod 387 toward the second baffle 382 until the first baffle 381 abuts against the end of the support plate 383. At this time, under the tension of the tension spring 386 and the reaction force of a contact surface at the end of the support plate 383, the first baffle 381 is fixed at a first position abutting against the end of the support plate 383. When the mobile terminal 130 such as the mobile phone or the tablet computer needs to be mounted, the user first grasps the first baffle 381 to pull the extension rod 387 outward, then places the mobile terminal 130 such as the mobile phone or the tablet computer on the support plate 383 and between the first baffle 381 and the second baffle 382, and releases the first baffle 381 so that the first baffle 381 and the extension rod 387 retract inward under the tension of the tension spring 386 until the first baffle 381 abuts against the edge of the mobile terminal 130. At this time, under the tension of the tension spring 386 and the reaction force of a contact surface at the edge of the mobile terminal 130, the first baffle plate 381 is fixed at a second position abutting against the edge of the mobile terminal 130. It is to be understood that when the mobile terminals 130 of different dimensions are clamped, multiple second positions at not the same specific positions exist, and these positions abutting against the edge of the mobile terminal 130 are collectively referred to as the second positions of the first baffle 381. The maximum distance between the first baffle 381 and the second baffle 382 is L2, and the difference between L2 and L1 is ΔL which denotes the amount of extension or retraction of the clamp of the fixture 316. For example, L2 may be 19 cm, and ΔL may be 9 cm. The fixture 316 of the mobile terminal 130 may fix the mobile terminal 130 such as the mobile phone or the tablet computer with a width or length between 10 cm and 19 cm. In fact, in practice, if the dimension of the mobile terminal 130 such as the mobile phone has a relatively small dimension, the mobile phone may be vertically clamped between the first baffle 381 and the second baffle 382, that is, the first baffle 381 and the second baffle 382 clamp the longer side of the mobile phone; if the mobile terminal 130 such as the tablet computer has a relatively large dimension, the tablet computer may be horizontally clamped between the first baffle 381 and the second baffle 382, that is, the first baffle 381 and the second baffle 382 clamp the shorter side of the tablet computer. At present, many clamps are on the market. Although the clamps have different structures, many of the clamps can firmly clamp the mobile terminals 130 of different dimensions. Since the clamps are widely used and inexpensive, the present application does not limit the specific structures of the clamps as long as the clamps can fixedly clamp the mobile terminals 130 of different dimensions.

Figure 20:
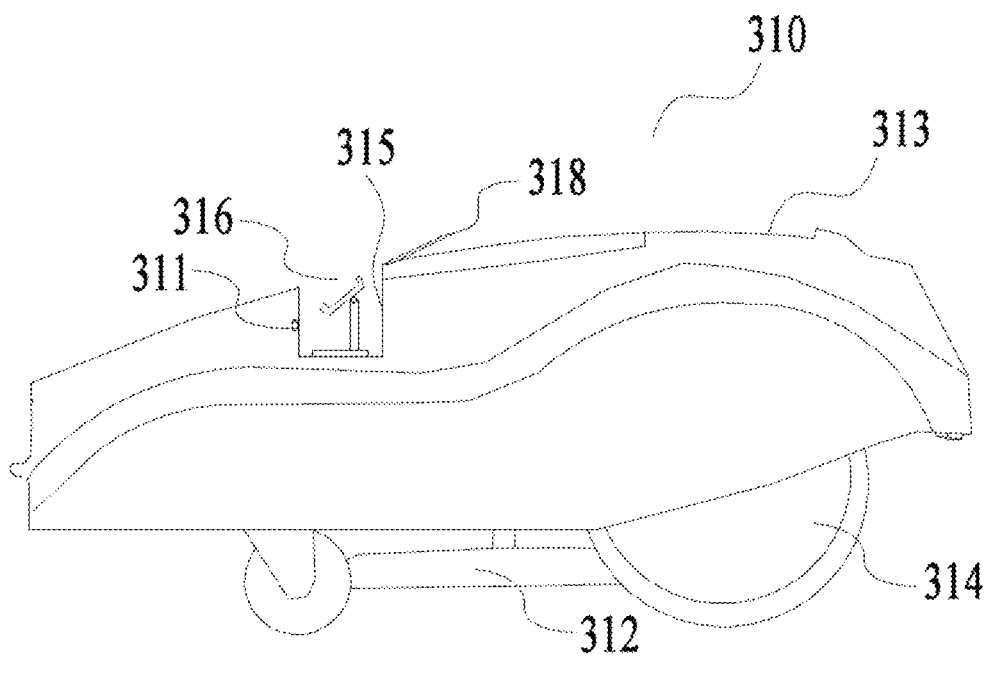
FIG. 20 is a side view of a smart mower in a smart mowing system according to another example of the present application.

The base 385 of the fixture 316 may be directly fixed on the surface of the body 313 of the smart mower 310 through the fastening mechanism such as the screw and the nut. As shown in FIG. 18, in this design, little structural modification is made to the existing smart mower and the cost is low, but there is a lack of aesthetics and neatness. Optionally, as shown in FIG. 20, the body 313 of the smart mower 310 is provided with an inward recessed accommodation cavity 315, a top opening of the accommodation cavity 315 is located on the upper surface of the body 313 of the smart mower 310, the base 385 of the fixture 316 is fixed in the accommodation cavity 315 through the fastening mechanism such as the screw and the nut, and a cover plate 318 is disposed on the top of the accommodation cavity 315 and can be opened and closed. For example, the cover plate 318 is hinged to one side of the top opening of the accommodation cavity 315 and includes a first position at which the cover plate 318 is opened and a second position at which the cover plate 318 is closed. Alternatively, the cover plate 318 is composed of a slide cover slidable back and forth and a slide cover guide rail and includes a first position at which the cover plate 318 covers the top opening of the accommodation cavity 315 and a second position at which the cover plate 318 exposes the opening of the accommodation cavity 315. The advantage of the accommodation cavity 315 and the cover plate 318 is that when the smart mower 310 is not in use, the fixture 316 is hidden and stored in the body 313 of the smart mower 310 so that on the one hand, the smart mower 310 is relatively neat and beautiful; and on the other hand, the fixture 316 is waterproof, dustproof, and lightproof, thereby reducing the requirements for cleaning the fixture 316 and slowing down the aging of the fixture 316. As shown in FIG. 20, the interface 311 may be disposed on the inner wall of the accommodation cavity 315, thereby reducing the intrusion of dust, water, and other substances. The specific forms of the accommodation cavity 315 and the cover plate 318 are not limited in the present application. In addition, the specific position of the accommodation cavity 315 may be determined according to the positions of an electric motor, a PCB, and other devices of the smart mower 310, so as to facilitate the collection of the image information around the smart mower 310, and the effect on the arrangement of various elements inside the body 313 of the smart mower 310 should be minimized, which is not limited in the present application. FIG. 20 is merely an example illustration.

During the non-working time, the fixture 316 of the mobile terminal 130 is hidden and stored in the body 313 of the smart mower 310. Therefore, before the smart mower 310 is equipped with the mobile terminal 130 for operation, the clamp of the fixture 316 needs to extend out of the body 313 of the smart mower 310, making it convenient for a camera 132 of the mobile terminal 130 to collect the image information around the smart mower 310. To achieve this object, the support rod 384 of the fixture 316 may be designed in a telescopic structure. For example, reference may be made to the inner and outer double tube structure of the bracket 123 in the first example. Before the smart mower 310 is equipped with the mobile terminal 130 for operation, an inner tube of the support rod 384 is pulled outward so that the length of the entire support rod 384 is lengthened, thereby extending the clamp out of the body 313 of the smart mower 310. When the smart mower 310 is not in operation or the smart mower 310 is not equipped with the mobile terminal 130 for operation, the inner tube of the support rod 384 is pushed back inward so that the length of the entire support rod 384 is shortened and the support rod 384 is completely stored in the accommodation cavity 315 of the smart mower 310. The present application does not limit the specific telescopic structure of the support rod 384 of the fixture 316 as long as the specific telescopic structure of the support rod 384 can achieve the effect of extension and retraction. Other structures that achieve the similar effect, such as a flexible or foldable support rod 384, are also within the scope of the present application.

As can be seen from FIG. 19A, the support rod 384 is rotatably connected to the clamp through the damping rotating shaft structure and a ball structure 388. The advantage of this is that when the smart mower 310 is equipped with the mobile terminal 130, according to the requirement of the actual working condition and the specific position of the camera 132 of the mobile terminal 130, the user may freely adjust the angle of the clamp, that is, the angle at which the mobile terminal 130 is fixed, that is, the angle at which the camera 132 of the mobile terminal 130 collects the image information about the environment around the smart mower 310. The present application does not limit the specific structure of the rotatable connection as long as the specific structure of the rotatable connection can achieve the effect of rotation. In some examples, the support rod 384 is comprised of multiple short rods connected in series so that the support rod 384 is foldable to save space and the angle of the clamp can be adjusted using hinge points between the short rods. With the help of the fixture 316, when the mobile terminal 130 is fixed on the body 313 of the smart mower 310, the position of the mobile terminal 130 is stationary relative to the smart mower 310, and it may be considered that the image information about the surrounding environment collected by the camera 132 of the mobile terminal 130 is the image information about the environment around the smart mower 310, and the pose information collected by an IMU 133 of the mobile terminal 130 is the pose information about the smart mower 310.

Referring to FIGS. 21A to 21C, the mobile terminal 130 includes the camera 132 for collecting image data of the environment around the smart mower 310; the IMU 133 for detecting position and pose data of the smart mower 310; the interface 131 at least used for data transmission and also used for charging; a memory for storing an application program 135 for controlling the operation of the smart mower 310; and a processor electrically connected to the camera 132 and the IMU 133 and used for calling the application program 135 to calculate and process information collected by the camera 132 and the IMU 133. The processor may call the application program 135 to fuse the data acquired by the camera 132 and the IMU 133 to achieve the SLAM of the smart mower 310 and generate the corresponding navigation or mowing action instruction according to the preset logic and real-time data to control the behavior of the smart mower 310. The mobile terminal 130 such as the mobile phone or the tablet computer commonly available on the market includes a monocular camera 132 and a binocular camera 132 or a multiocular camera 132. The monocular camera 132 is different from the binocular camera 132 or the multiocular camera 132 in the principle of distance measurement. The binocular camera 132 or the multiocular camera 132 resembles the human eyes, determines the distance mainly through the calculation of the parallax of two images, and can perform depth estimation when the binocular camera or the multiocular camera is stationary so that the accuracy of the data is better, but the calculation of the parallax is quite resource-intensive, resulting in the disadvantages of a large calculation amount and high energy consumption. Although the image frame collected by the monocular camera 132 loses the depth information about the environment, this disadvantage can be alleviated to some extent by fusing the pose data collected by the IMU 133. For example, the movement and rotation of the camera are calculated according to an offset of a feature point between the front and rear frames captured by the monocular camera 132 and by fusing the pose data collected by the IMU 133. Therefore, the present application does not strictly limit the number of cameras 132 provided in the mobile terminal 130.

The IMU 133 includes at least the accelerometer and the gyroscope and may further include the magnetometer. An Android mobile phone is used as an example. The IMU data includes 9 items of data including 3 items of data from the accelerometer (3-axis), 3 items of data from the gyroscope (3-axis), and 3 items of data from the magnetometer (3-axis). Generally, the IMU is placed at the position of the center of gravity of the object, but the IMU 133 of the mobile terminal 130 fixed to the fixture 316 generally has a linear distance of a few tens of centimeters (for example, 30 centimeters) from the center of gravity G of the smart mower 310. To solve this problem, a sensor position offset compensation parameter may be provided when the application program 135 performs IMU data processing and may include 3-axis data (X, Y, Z). X denotes the front-and-back distance between the IMU 133 of the mobile terminal 130 and the center of gravity G of the smart mower 310, where a positive value of X represents that the center of gravity G of the smart mower 310 is in front of the IMU 133 of the mobile terminal 130, and a negative value of X represents that the center of gravity G of the smart mower 310 is behind the IMU 133 of the mobile terminal 130. Y denotes the left-and-right distance between the IMU 133 of the mobile terminal 130 and the center of gravity G of the smart mower 310, where a positive value of Y represents that the center of gravity G of the smart mower 310 is to the right of the IMU 133 of the mobile terminal 130, and a negative value of Y represents that the center of gravity G of the smart mower 310 is to the left of the IMU 133 of the mobile terminal 130. Z denotes the up-and-down distance between the IMU 133 of the mobile terminal 130 and the center of gravity G of the smart mower 310, where a positive value of Z represents that the center of gravity G of the smart mower 310 is below the IMU 133 of the mobile terminal 130, and a negative value of Y represents that the center of gravity G of the smart mower 310 is above the IMU 133 of the mobile terminal 130.

In addition to the camera 132 and the IMU 133, the mobile terminal 130 may further include other sensors such as the GPS sensor, and corresponding logic codes for sensor fusion are preset in the application program 135. The application program 135 performs a process of visual-inertial fusion SLAM and a process involving the fusion of more sensors and includes applications of specific functions involving mowing region boundary generation, road selection, smart obstacle avoidance, virtual fence and virtual obstacle setting, smart lighting, mowing timing selection, and the like. The application program 135 is similar to the control program 145 of the smart mower 110 and is not repeated here.

Figure 22A:
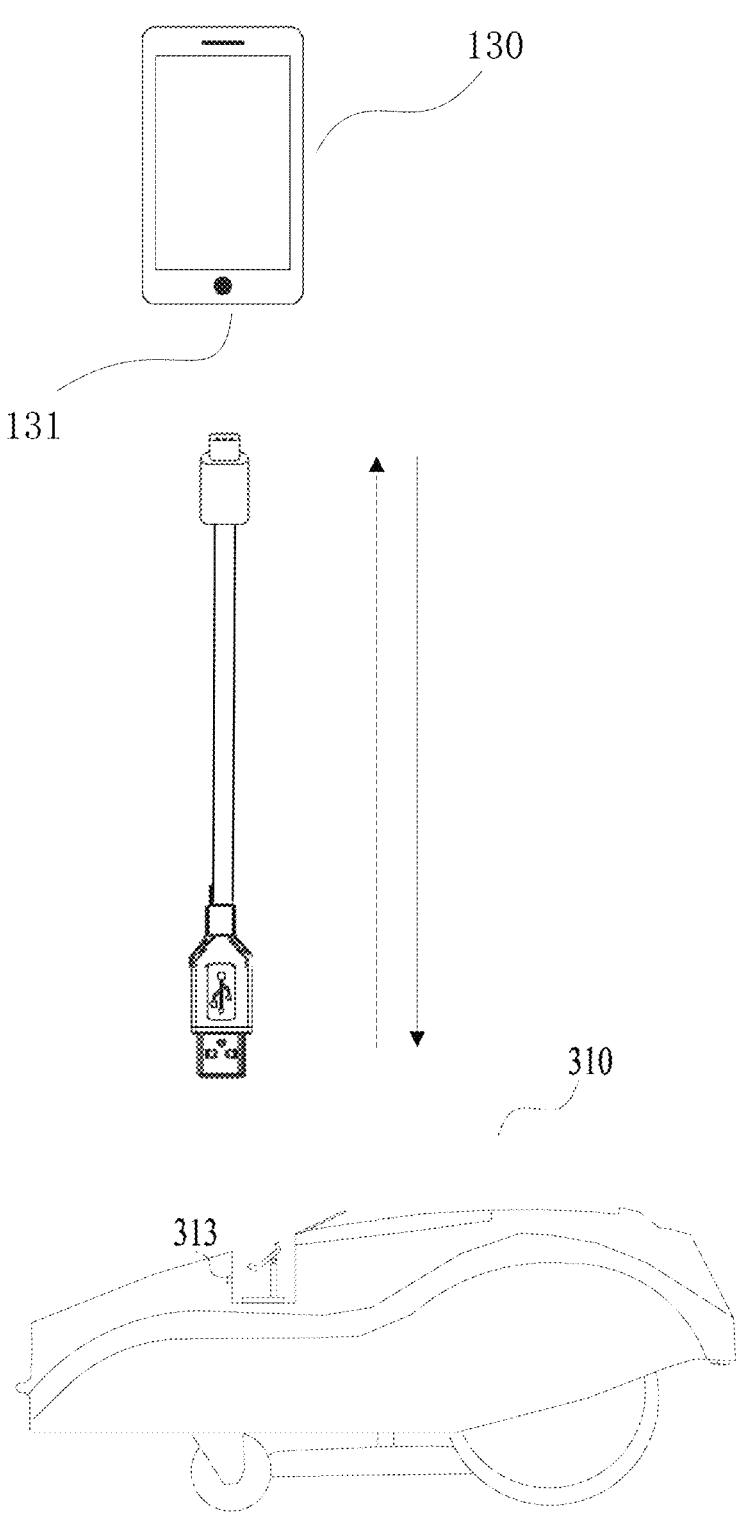
FIG. 22A is a first data transmission architecture view of a smart mowing system according to another example of the present application.

Referring to FIGS. 22A to 22E, various manners in which communication between the smart mower 310 and the mobile terminal 130 is achieved exist. In the present application, the specific communication manner between the smart mower 310 and the mobile terminal 130 is not limited. For example, a Type-C Male interface may be provided on the second baffle 382 of the fixture 316. When the mobile terminal 130 is fixed to the fixture 316, a Type-C Female interface of the mobile terminal is plugged into the Type-C Male interface of the fixture 316, so as to achieve data transmission between the mobile terminal 130 and the smart mower 310. However, this connection manner limits an interface type. If the interface type of the mobile terminal 130 of the user is different from the preset interface type of the smart mower 310, an adapter is needed. An independent data cable connecting two interfaces can solve the problem of interface incompatibility. As shown in FIG. 22A, the smart mower 310 has a Universal Serial Bus (USB) data transmission interface 311. If the mobile terminal 130 has a Type-C data transmission interface 131, the data transmission between the mobile terminal 130 and the smart mower 310 can be achieved through a USB Type-C data cable, one end of which is connected to the USB data transmission interface 311 of the smart mower 310, and the other end of which is connected to the Type-C data transmission interface 131 of the mobile terminal 130. If the data transmission interface 131 of the mobile terminal 130 of the user is an Android data interface, the data transmission between the mobile terminal 130 and the smart mower 310 can be achieved through a USB-Android data cable, one end of which is connected to the USB data transmission interface 311 of the smart mower 310, and the other end of which is connected to the Android data transmission interface 131 of the mobile terminal 130. Further, the use of the independent data cable has the advantage of adaptability to the extension and retraction or rotation of the fixture 316. In addition, a USB transmission interface is commonly used for a charger head of the mobile terminal 130 such as the mobile phone or the tablet computer, that is to say, one end of a charging cable of the mobile terminal 130 such as the mobile phone or the tablet computer connected to the charger head is basically the USB transmission interface. In this manner, not only is the universality of the USB data transmission interface 311 of the smart mower 310 improved, but also the data cable may be provided by the user since this data cable is the charging cable of the mobile terminal 130 such as the mobile phone or the tablet computer, thereby further reducing the cost of the smart mower 310.

When the wired connection is adopted, the application program 135 of the mobile terminal 130 calls the image data collected by the camera 132 and the pose data collected by the IMU 133 and fuses the two types of data for the SLAM. In this process, an open-source AR resource package may be called. For example, the application program 135 developed for the Apple mobile terminal 130 may call the ARKit development tool set, and the application program 135 developed for the Android mobile terminal 130 may call the ARCore development tool set. The application program 135 of the mobile terminal 130 generates a specific navigation or mowing action instruction according to the preset program and an output result of the SLAM and returns the navigation or mowing action instruction to the smart mower 310 as shown by a solid arrow in FIG. 22A. The preset program may specifically include multiple application functions, for example, automatic generation of the mowing boundary, virtual fence setting, road recognition, smart obstacle avoidance, virtual obstacle setting, and the like. The preset program may call a resource package having the object recognition function, such as TensorFlow Lite, to implement the object recognition function. Alternatively, considering that the smart mower 310 may further include other sensors such as the crash sensor and the drop sensor, the smart mower 310 may send data collected by these sensors to the mobile terminal 130 as shown by a dotted arrow in FIG. 22A. After the data is integrated by the application program 135 of the mobile terminal 130, the specific navigation or mowing action instruction is generated according to the preset program, and then the instruction is transmitted to the smart mower 310 through the wired transmission as shown by the solid arrow in FIG. 22A.

Figure 22B:
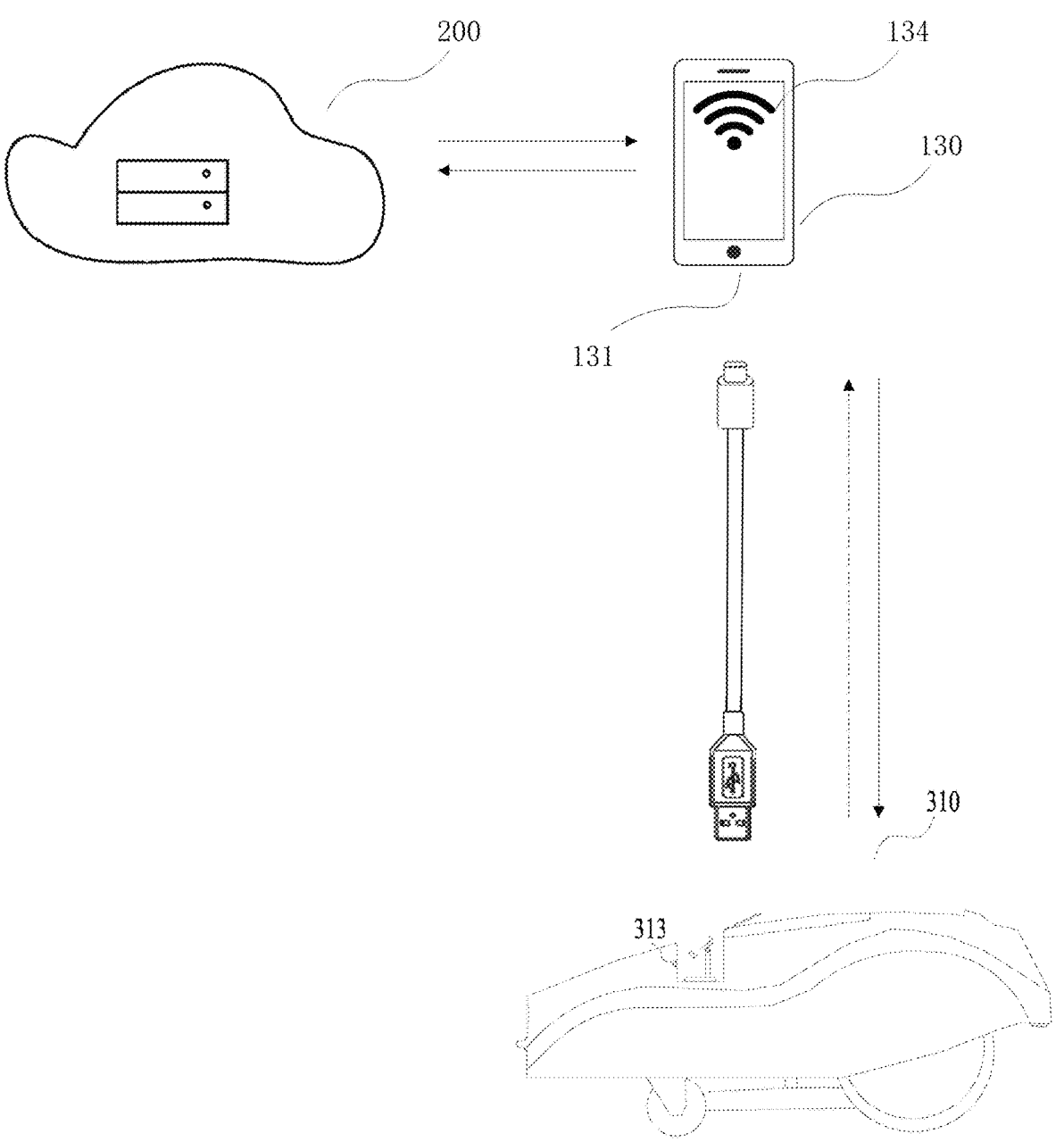
FIG. 22B is a second data transmission architecture view of a smart mowing system according to another example of the present application.

Furthermore, based on the communication between the smart mower 310 and the mobile terminal 130, as shown in FIG. 22B, the mobile terminal 130 further includes a wireless network connection device 134 that can achieve data transmission with the cloud server 200 so that the application program 135 of the mobile terminal 130 does not need to complete all the operations locally at the mobile terminal 130, and part or all of the operations are completed at the cloud server 200. For example, during the SLAM process, all the image data collected by the camera 132 and the angular velocity and acceleration data collected by the IMU 133 are uploaded to the cloud server 200 for fusion. Alternatively, data preprocessing such as feature point extraction of the image frame is performed locally at the mobile terminal 130, and then the preprocessed data is sent to the cloud server 200 for fusion, so as to reduce the dependence on a wireless communication rate. In addition to the SLAM, the cloud server 200 may also run other program logic. With the capabilities of cloud computing and cloud storage, the cloud server 200 can take advantage of functional applications such as obstacle recognition, boundary recognition, road recognition, and path planning. The mobile terminal 130 may also upload settings and preferences of the user to the cloud server 200, for example, mowing height preferences, anchor points printed on the lawn, and the like. The cloud server 200 may autonomously acquire relevant information from the Internet, such as weather and seasons, to generate the navigation or mowing action instruction to control the behavior of the smart mower 310. After acquiring the instruction from the cloud server 200, the application program 135 of the mobile terminal 130 transmits the instruction to the smart mower 310 through the wired transmission.

Figure 22C:
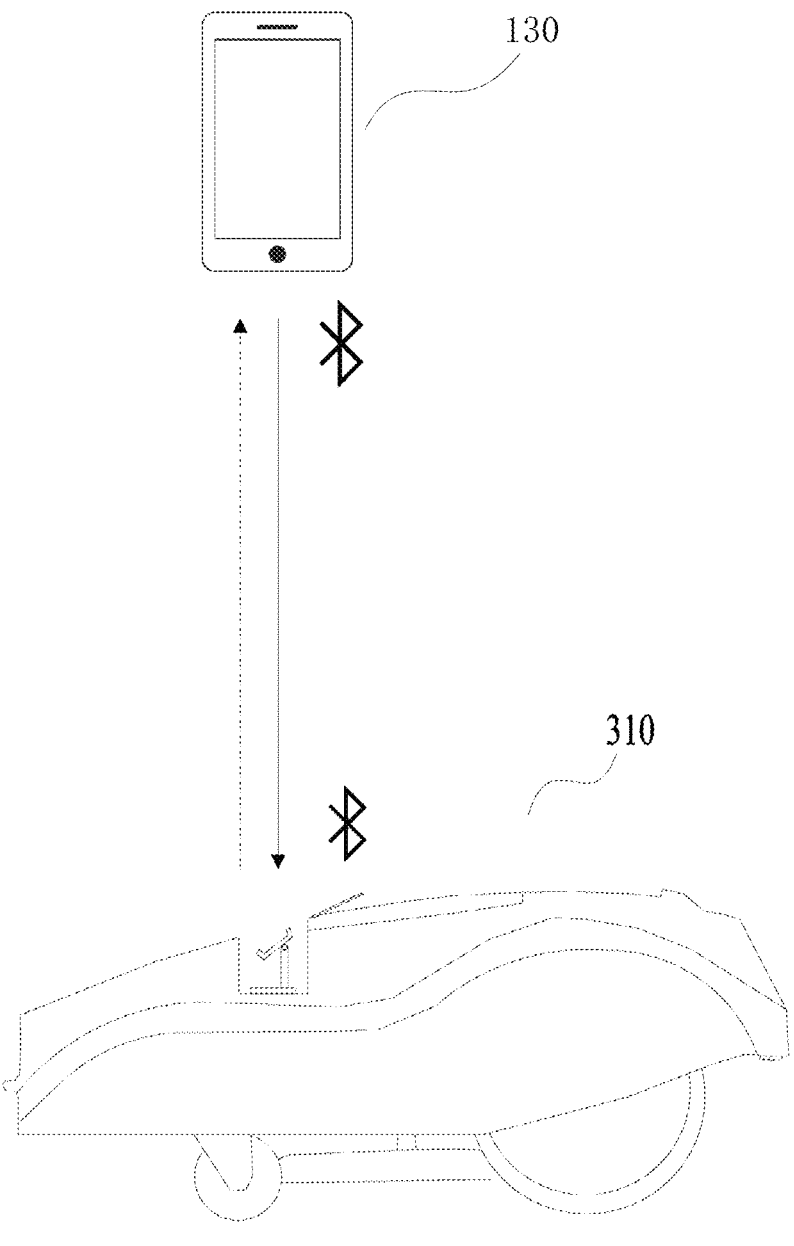
FIG. 22C is a third data transmission architecture view of a smart mowing system according to another example of the present application.

Alternatively, wireless data transmission may be adopted between the smart mower 310 and the mobile terminal 130. As shown in FIG. 22C, since the distance between the smart mower 310 and the mobile terminal 130 is always very close when the smart mower 310 is equipped with the mobile terminal 130 for operation, short-range wireless communication may be achieved between the smart mower 310 and the mobile terminal 130, such as Bluetooth, Zigbee, and near-field communication (NFC). In this solution, both the smart mower 310 and the mobile terminal 130 need to have matching short-range wireless communication devices. For example, each of the smart mower 310 and the mobile terminal 130 has a Bluetooth module. Compared to the wired communication shown in FIGS. 22A and 22B, the short-range wireless communication solution essentially only changes a wired interface between the smart mower 310 and the mobile terminal 130 to a wireless interface, and there are no differences in other aspects (the transmission content, system architecture, and the like).

Figure 22D:
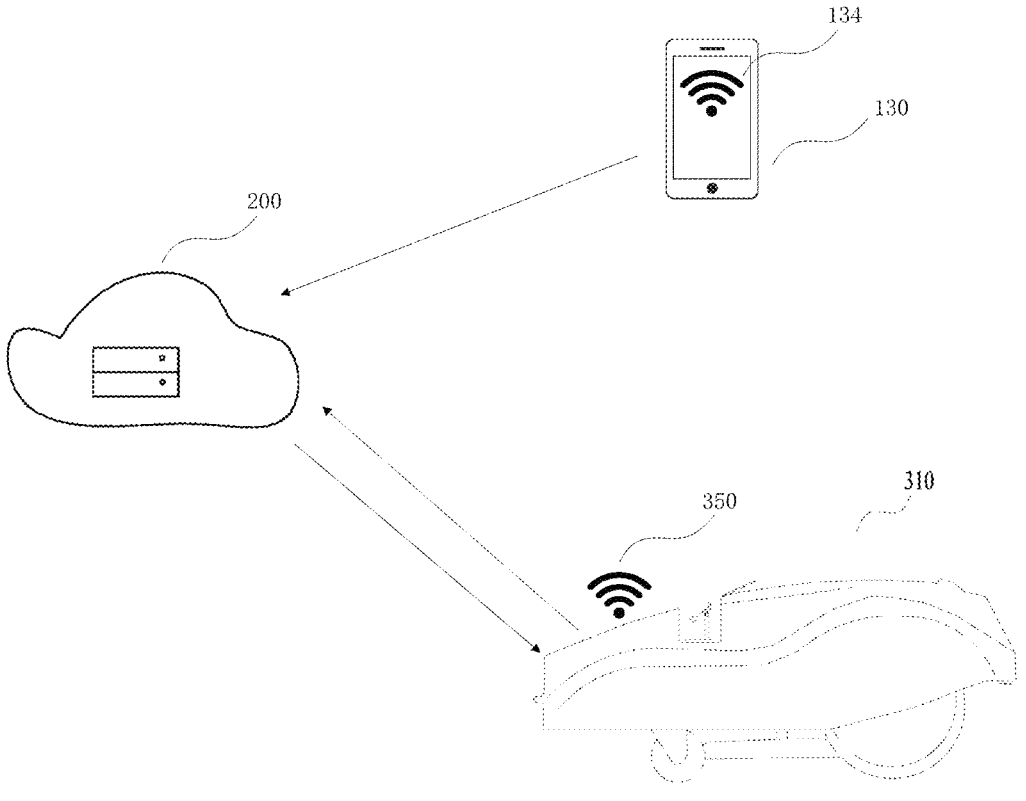
FIG. 22D is a fourth data transmission architecture view of a smart mowing system according to another example of the present application.

Alternatively, as shown in FIG. 22D, the mobile terminal 130 has the wireless network connection device 134 such as the wireless network card or a wireless local-area network (WLAN) module, and the smart mower 310 has a wireless network connection device 350 such as the wireless network card or the WLAN module. When the lawn of the user is fully covered by a wireless network, both the mobile terminal 130 and the smart mower 310 may connect to the cloud server 200 through the wireless network. The application program 135 of the mobile terminal 130 may upload all the image data collected by the camera 132 and the angular velocity and acceleration data collected by the IMU 133 to the cloud server 200 for AR fusion. Alternatively, data preprocessing such as feature point extraction is performed locally at the mobile terminal 130, and then the preprocessed data is sent to the cloud server 200 for AR fusion, so as to reduce the dependence on the communication rate. At the same time, the smart mower 310 may also upload the information collected by other sensors such as the crash sensor and the drop sensor (if any, indicated by a dotted arrow in FIG. 22D) to the cloud server 200, and the information may participate as parameters in the calculation and decision-making process of the cloud server 200. After the cloud server 200 makes the navigation or mowing action instruction according to various uploaded data and built-in programs, the result is directly returned to the smart mower 310. Compared to FIG. 22B in which the calculation result is returned to the mobile terminal 130 by the cloud server 200 and then returned to the smart mower 310 by the mobile terminal 130, the cloud server 200 directly returns the result to the smart mower 310, having the advantage of reducing latency.

Figure 22E:
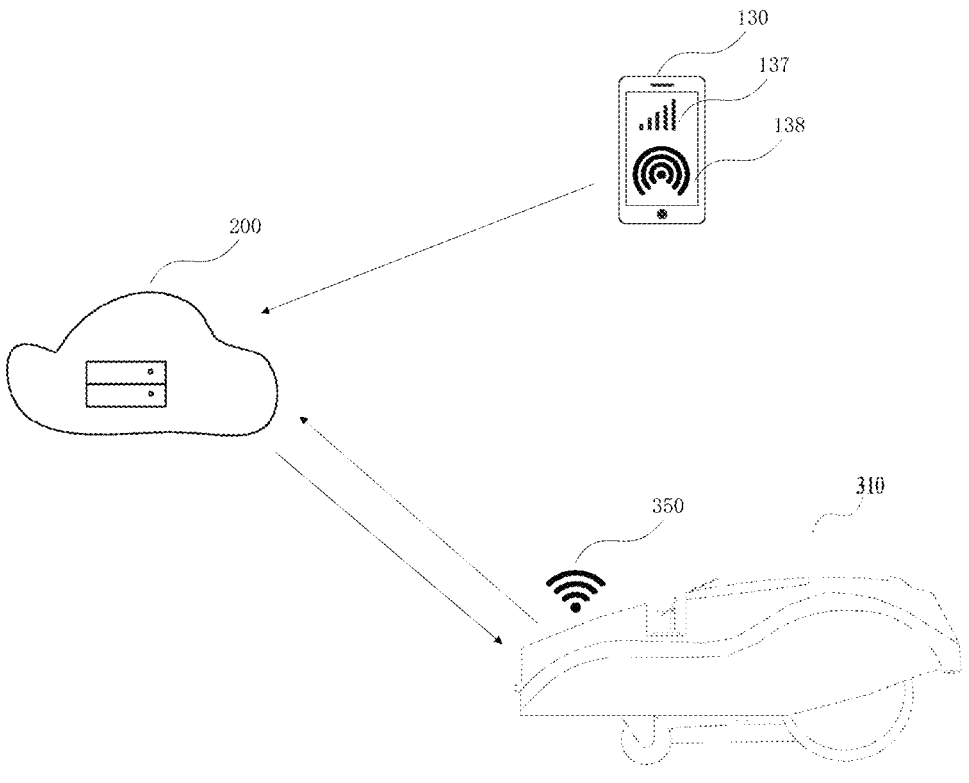
FIG. 22E is a fifth data transmission architecture view of a smart mowing system according to another example of the present application.

Referring to FIG. 22E, there is a complementary implementation when the lawn of the user fails to achieve full coverage of the wireless network due to an excessive area. Since the mobile terminal 130 such as the mobile phone generally has functions of mobile network reception 137 and a Wi-Fi hotspot 138, a mobile network signal received by the mobile terminal 130 may be converted into a Wi-Fi signal and sent out, and the smart mower 310 has the wireless network connection device 350 such as the wireless network card or the WLAN module and can achieve wireless communication with the cloud server 200 through a Wi-Fi network sent out by the Wi-Fi hotspot 138 of the mobile terminal 130. When the smart mower 310 and the mobile terminal 130 are not in the same Wi-Fi network, for example, the smart mower 310 accesses the network through a hotspot network of the mobile terminal 130, and the mobile terminal 130 accesses the network through the mobile network, the cloud server 200 may not automatically identify the pairing between the smart mower 310 and the mobile terminal 130. At this time, when the application program 135 and the smart mower 310 upload data, an identifier (ID) of the smart mower 310 may be added as an identification code; and when the smart mower 310 acquires an instruction, the ID of the smart mower 310 may be used as a certificate.

Compared with the first example, the smart mowing system 100 integrating the smart mower 310 with the mobile terminal 130 reduces the hardware requirement for the smart mower 310 and saves the costs of the camera 132 and the IMU 133; and the AR operation with a relatively high requirement for computing resources is shifted to the application program of the mobile terminal 130, thereby reducing the requirement for a processor chip of the smart mower 310 and saving the chip costs. In addition, people use the mobile terminal 130 more frequently in daily situations, and the application program 135 on the mobile terminal 130 is more convenient to upgrade, maintain, and expand through platforms of various application markets. For example, the application program 135 V1.0.0 may be a purely local operation, and the application program 135 V1.2.0 may mainly rely on the local operation, but an image for the object recognition calculation needs to be uploaded to the cloud server 200, and the type of the obstacle is determined more accurately through big data. From another perspective, the mobile terminal 130 is fixed to the smart mower 310 when the smart mower 310 is in operation, bringing a certain degree of inconvenience to the user, as many people today are accustomed to keeping the mobile phone in their hands and only leaving the mobile phone for a while during charging. To alleviate the phone separation anxiety of the user as much as possible and prevent the remaining power of the mobile terminal 130 from being too low to complete a complete mowing task, the smart mower 310 may be configured to, when the smart mower 310 is connected to the mobile terminal 130, the battery pack of the smart mower 310 is used to charge the battery of the mobile terminal 130. At the same time, a charging threshold, for example, 70%, may be set to avoid problems such as an abrupt decrease in working time and over-discharge of the battery pack due to continuously charging the mobile terminal 130 even when the smart mower 310 runs low on its own power. That is, if the remaining power of the battery pack of the smart mower 310 is greater than or equal to 70%, the connected mobile terminal 130 is charged; and if the remaining power of the battery pack of the smart mower 310 is less than 70%, the connected mobile terminal 130 is not charged. It is to be noted here that 70% is merely an example and does not limit the scope of the present application, and any solution of setting a threshold of the remaining power of the smart mower 310 to determine whether the smart mower 310 charges the connected mobile terminal 130 falls within the scope of the present application.

What is claimed is:

1. A smart mower, comprising:
    a camera for collecting image data of an environment around the smart mower;
    an inertial measurement unit (IMU) for detecting a pose data of the smart mower;
    a memory storing an application program for controlling the smart mower to work or travel;
    a processor for calling the application program, fusing the image data collected by the camera and the pose data acquired by the IMU, performing simultaneous localization and mapping (SLAM) of the smart mower, and generating a navigation or mowing action instruction; and
    a global positioning system (GPS) sensor, wherein:
        (a) when all of the camera, the IMU, and the GPS sensor fail, traveling is stopped and a maintenance reminder is sent;
        (b) when two of the camera, the IMU, or the GPS sensor fail, a remaining one of the camera, the IMU, or the GPS sensor is used for positioning and navigation for a preset time; and
        (c) when only one of the camera, the IMU, or the GPS sensor fail, a remaining two of the camera, the IMU, or the GPS sensor are used for positioning and navigation.

2. The smart mower of claim 1, further comprising a body and wherein the camera is mounted on a front side of the body.

3. The smart mower of claim 1, wherein the application program is capable of distinguishing between grassland and non-grassland according to a feature point of a two-dimensional (2D) plane in the image data and a texture feature of the grassland for comparison and automatically generating a mowing region boundary with a boundary line between the grassland and the non-grassland as discrete anchor points through visual-inertial fusion SLAM.

4. The smart mower of claim 1, further comprising a cutting blade, wherein the application program is capable of distinguishing between grassland and non-grassland according to a feature point of a 2D plane in the image data and a texture feature of the grassland for comparison and, when a current workplane is not the grassland, stopping rotating the cutting blade.

5. The smart mower of claim 1, wherein the application program is capable of determining a type of a current workplane according to a feature point of a 2D plane in the image data and a texture feature of a common type of ground preset by the application program for comparison and, when the current workplane comprises a plurality of ground types, controlling the smart mower to travel to the ground with greater hardness among the plurality of ground types.

6. The smart mower of claim 1, wherein the application program further comprises an object recognition program and the application program is capable of selecting a corresponding obstacle avoidance strategy according to an obstacle category recognized by the object recognition program.

7. The smart mower of claim 1, further comprising a light, wherein the application program is capable of acquiring a light intensity of current environment according to the image data and, when the light intensity is less than a first light intensity threshold, turning on the light.

8. The smart mower of claim 1, wherein when the GPS sensor fails, the processor fuses the image data collected by the camera and the pose data acquired by the IMU to perform simultaneous localization and mapping (SLAM) of the smart mower; when the camera fails, data of the IMU is used to verify result of the GPS; when the IMU fails, visual simultaneous localization and mapping (vSLAM) is performed, after each frame of image processing, a vSLAM result and a current GPS positioning result are sent to a Kalman filter at the same time.

* * * * *